United States Patent
Tohzaka et al.

(10) Patent No.: US 10,439,749 B2
(45) Date of Patent: Oct. 8, 2019

(54) WIRELESS COMMUNICATION DEVICE AND WIRELESS COMMUNICATION SYSTEM

(71) Applicant: Kabushiki Kaisha Toshiba, Minato-ku (JP)

(72) Inventors: Yuji Tohzaka, Kawasaki (JP); Ren Sakata, Yokohama (JP); Sakie Nagakubo, Kawasaki (JP); Hiroki Kudo, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 136 days.

(21) Appl. No.: 15/689,180

(22) Filed: Aug. 29, 2017

(65) Prior Publication Data
US 2018/0278353 A1    Sep. 27, 2018

(30) Foreign Application Priority Data
Mar. 22, 2017 (JP) .................................. 2017-055912

(51) Int. Cl.
*H04J 3/16* (2006.01)
*H04W 52/02* (2009.01)
(Continued)

(52) U.S. Cl.
CPC ....... *H04J 3/1694* (2013.01); *H04W 52/0216* (2013.01); *H04W 72/0446* (2013.01);
(Continued)

(58) Field of Classification Search
CPC . Y02D 70/142; Y02D 70/00; H04W 52/0216; H04W 84/12; H04W 84/18; H04W 72/0446
See application file for complete search history.

(56) References Cited

U.S. PATENT DOCUMENTS

2012/0064933 A1* 3/2012 Sakata .................. H04L 5/0053
455/509
2012/0320809 A1* 12/2012 Sturm ............... H04W 52/0235
370/311
(Continued)

FOREIGN PATENT DOCUMENTS

JP    2010-171902 A    8/2010
JP    2014-103580 A    6/2014
(Continued)

*Primary Examiner* — Jung H Park
(74) *Attorney, Agent, or Firm* — Oblon, McClelland, Maier & Neustadt, L.L.P.

(57) ABSTRACT

According to an embodiment, a wireless communication device performs time-division communication and includes a storage and one or more processors. The storage is configured to store transmission data to be sent in a first period of time. The one or more processors are configured to perform a transmission process of sending the transmission data in a first frame at start of a plurality of frames included in the first period of time, or perform a transmission process of sending a pieces of divided the transmission data in a plurality of successive frames beginning from the first frame and included in the first period of time. After the transmission process, the wireless communication device switches to sleep mode in one or more frames of the first period of time.

8 Claims, 20 Drawing Sheets

(51) Int. Cl.
*H04W 72/04* (2009.01)
*H04W 76/11* (2018.01)
*H04L 1/00* (2006.01)

(52) U.S. Cl.
CPC .......... *H04W 76/11* (2018.02); *H04L 1/0006* (2013.01); *H04L 1/0083* (2013.01); *Y02D 70/00* (2018.01); *Y02D 70/142* (2018.01)

(56) References Cited

U.S. PATENT DOCUMENTS

2016/0066319 A1\* 3/2016 Sakata ................. H04B 7/2121
370/336
2017/0027003 A1\* 1/2017 Kojima ............... H04W 28/065

FOREIGN PATENT DOCUMENTS

| JP | 2014-175894 A | 9/2014 |
| JP | 2015-136010 A | 7/2015 |
| JP | 2015-198333 | 11/2015 |
| JP | 2016-54349 | 4/2016 |

\* cited by examiner

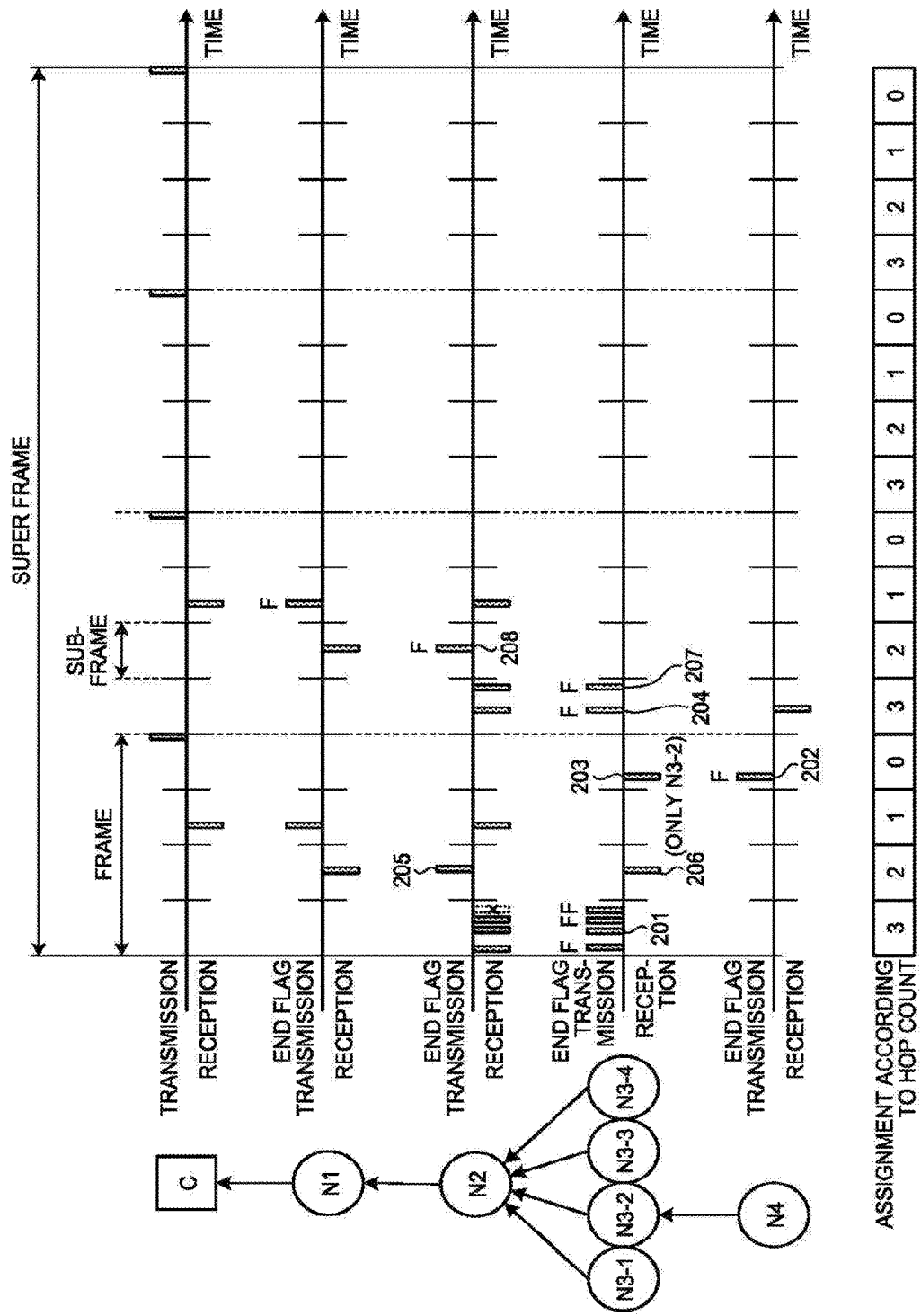

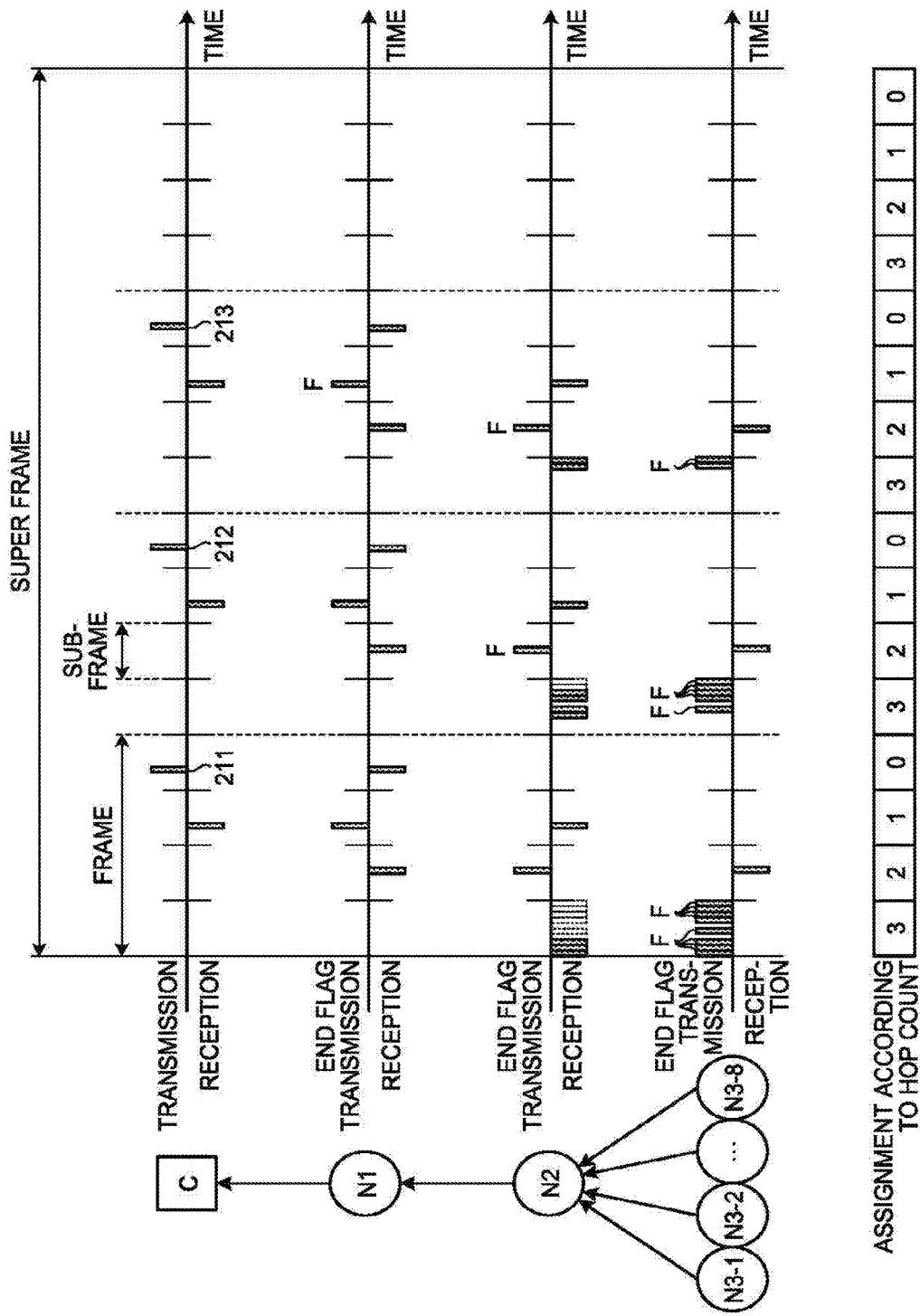

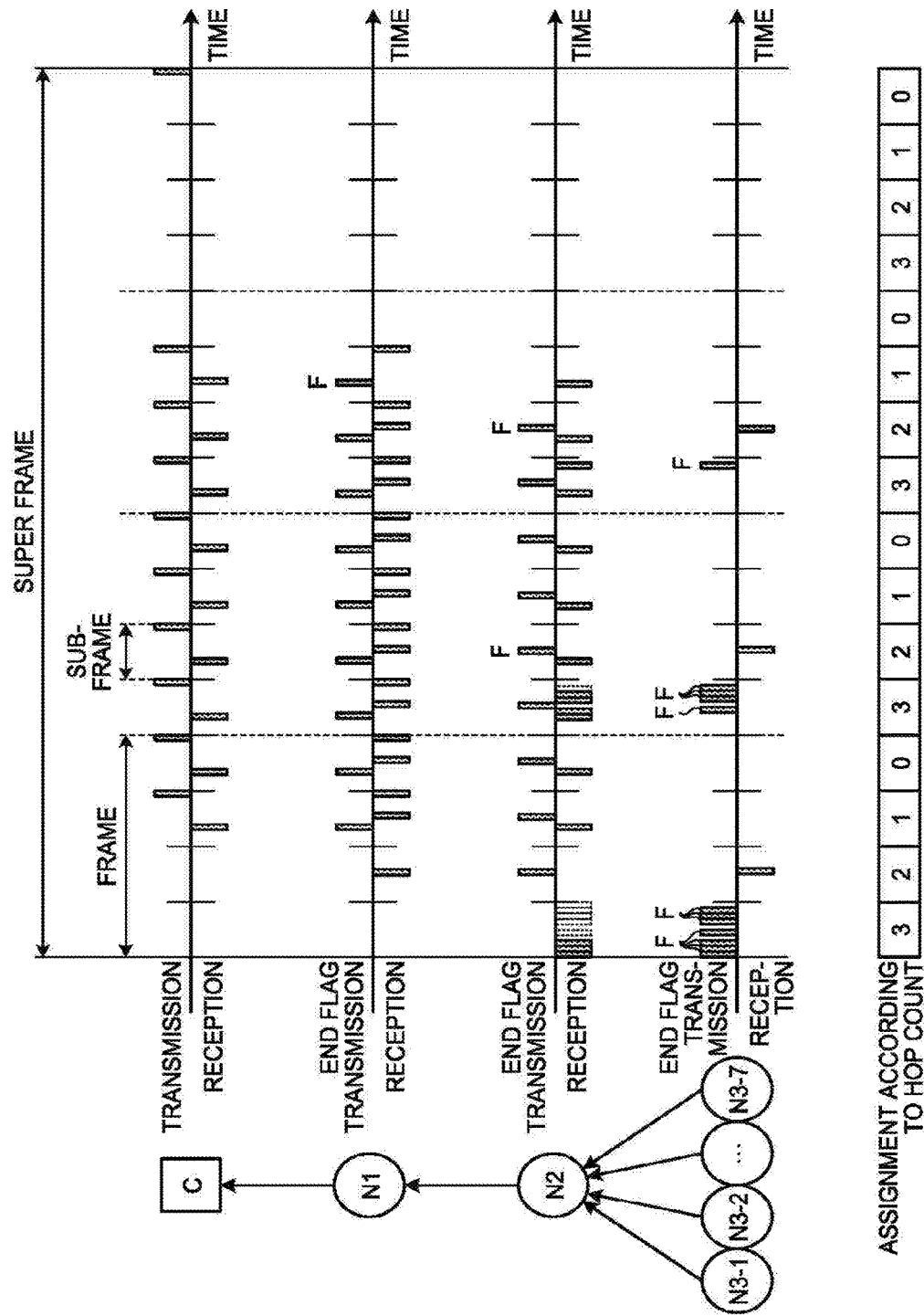

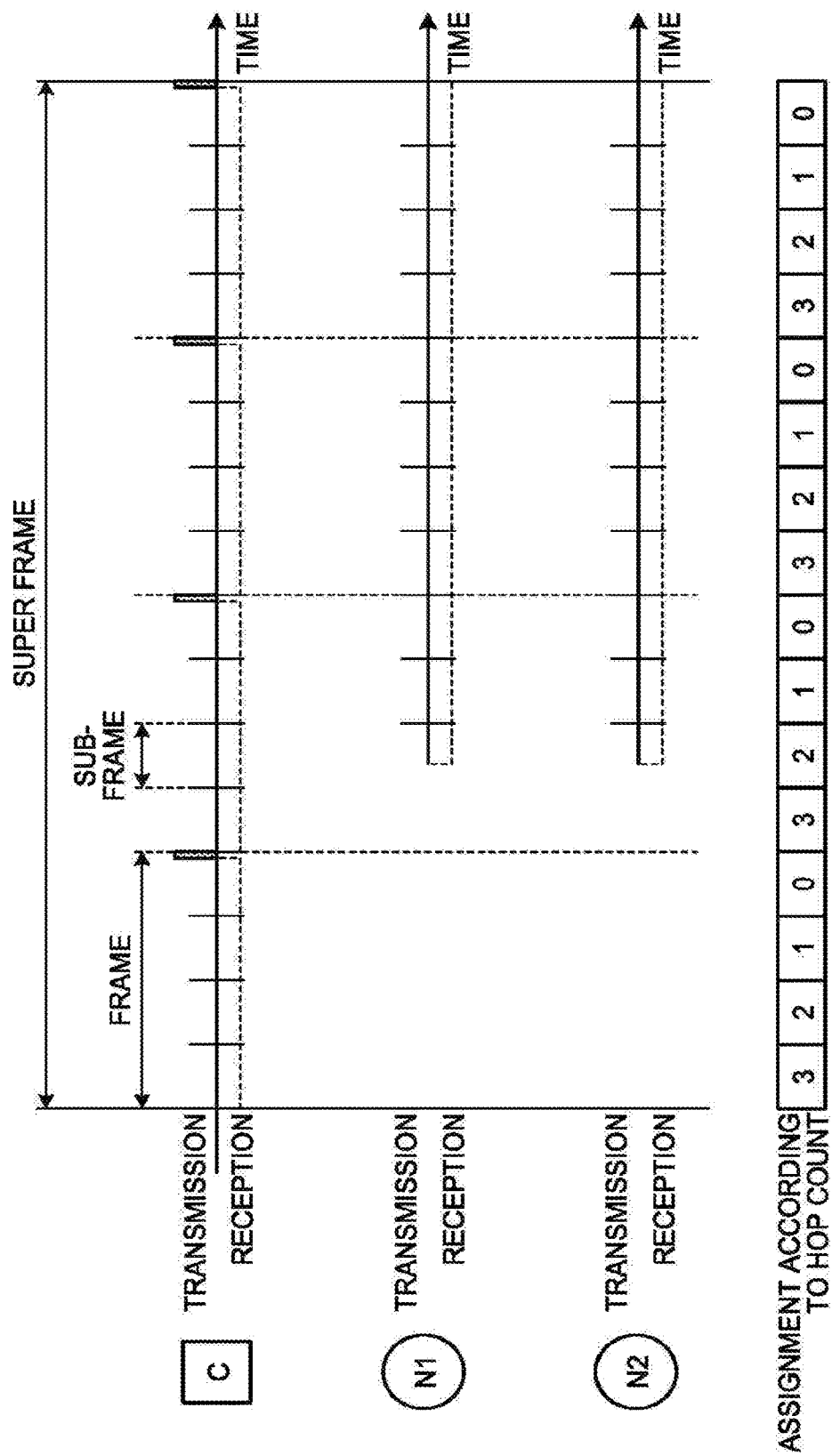

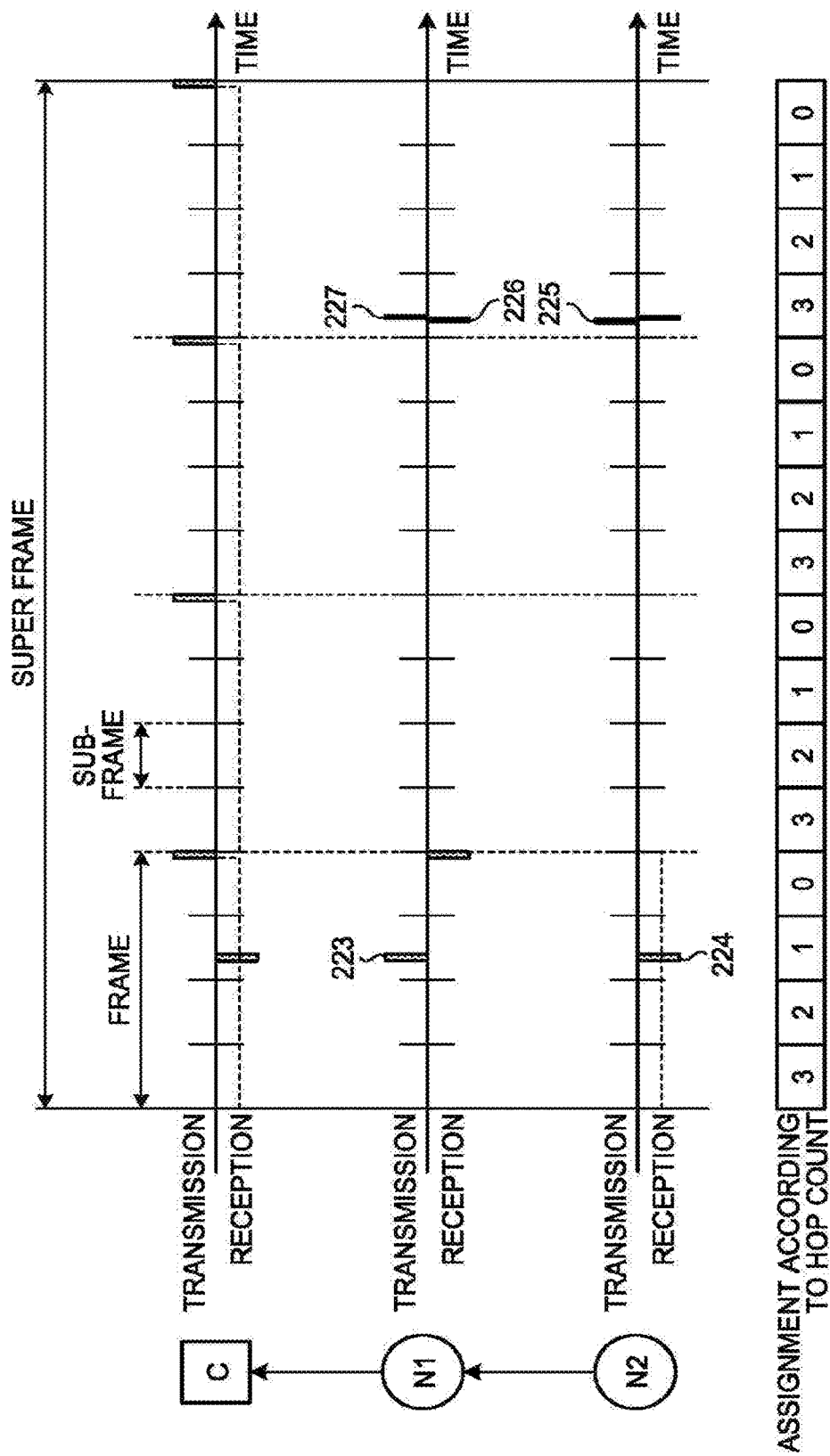

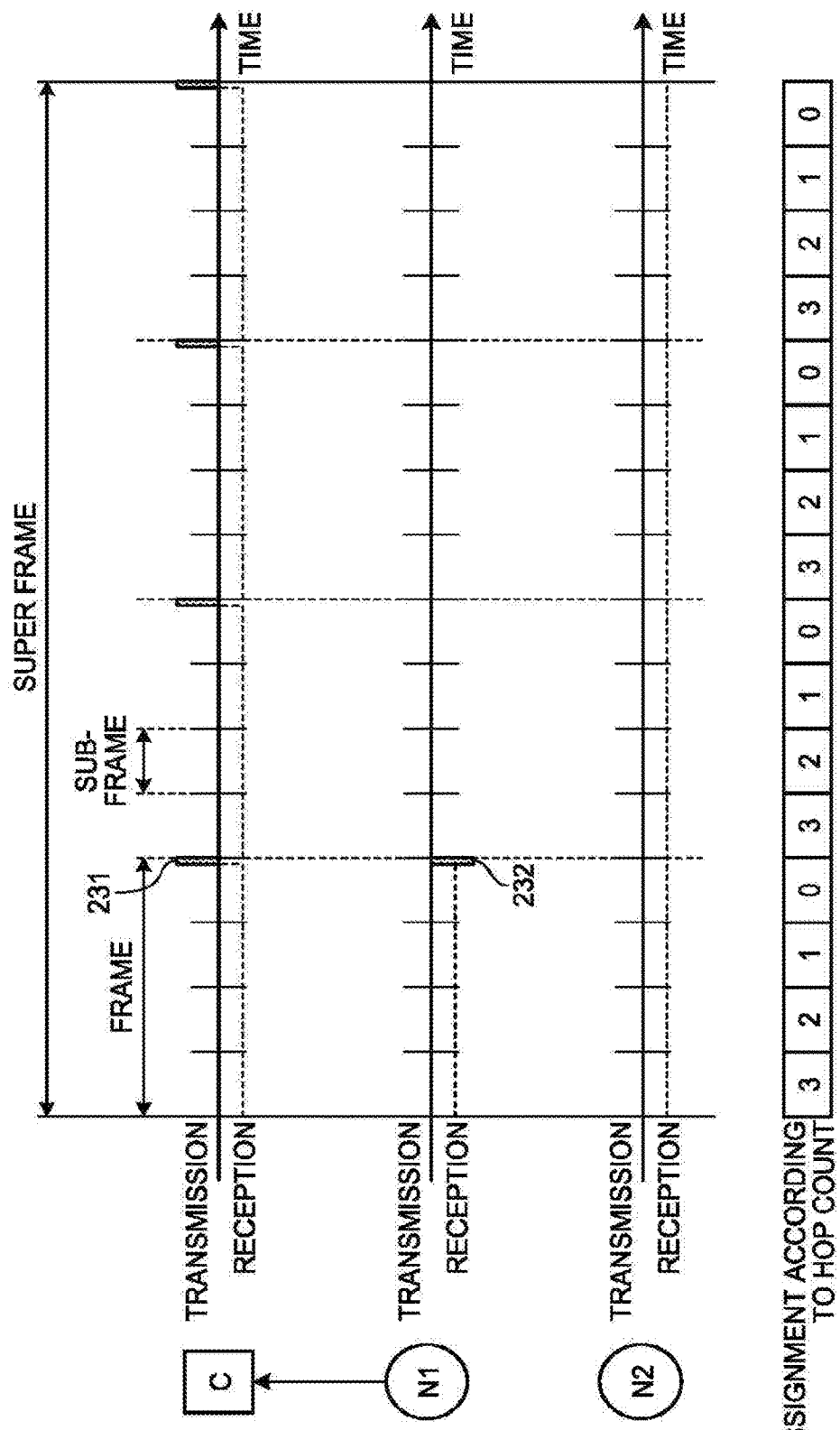

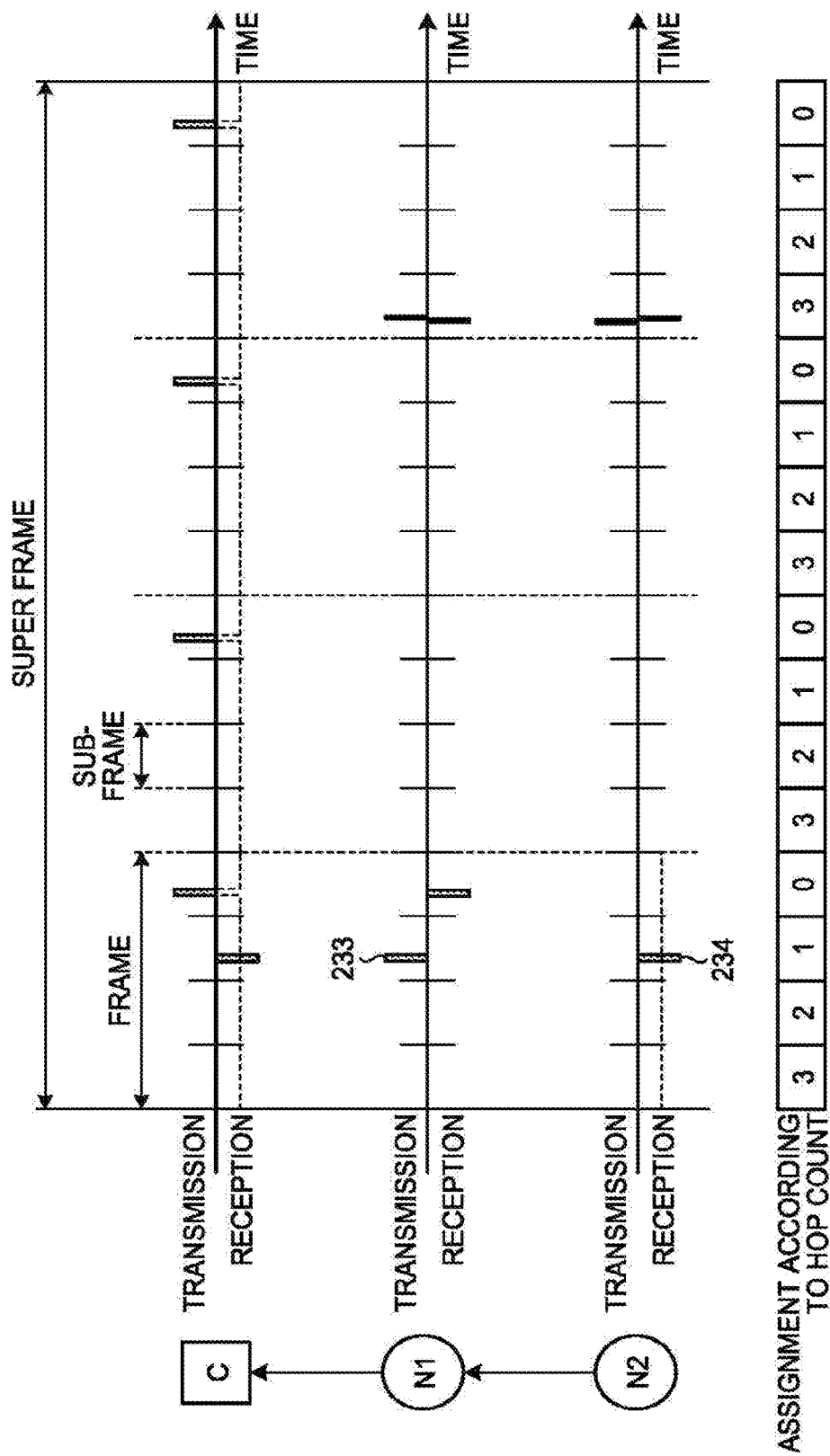

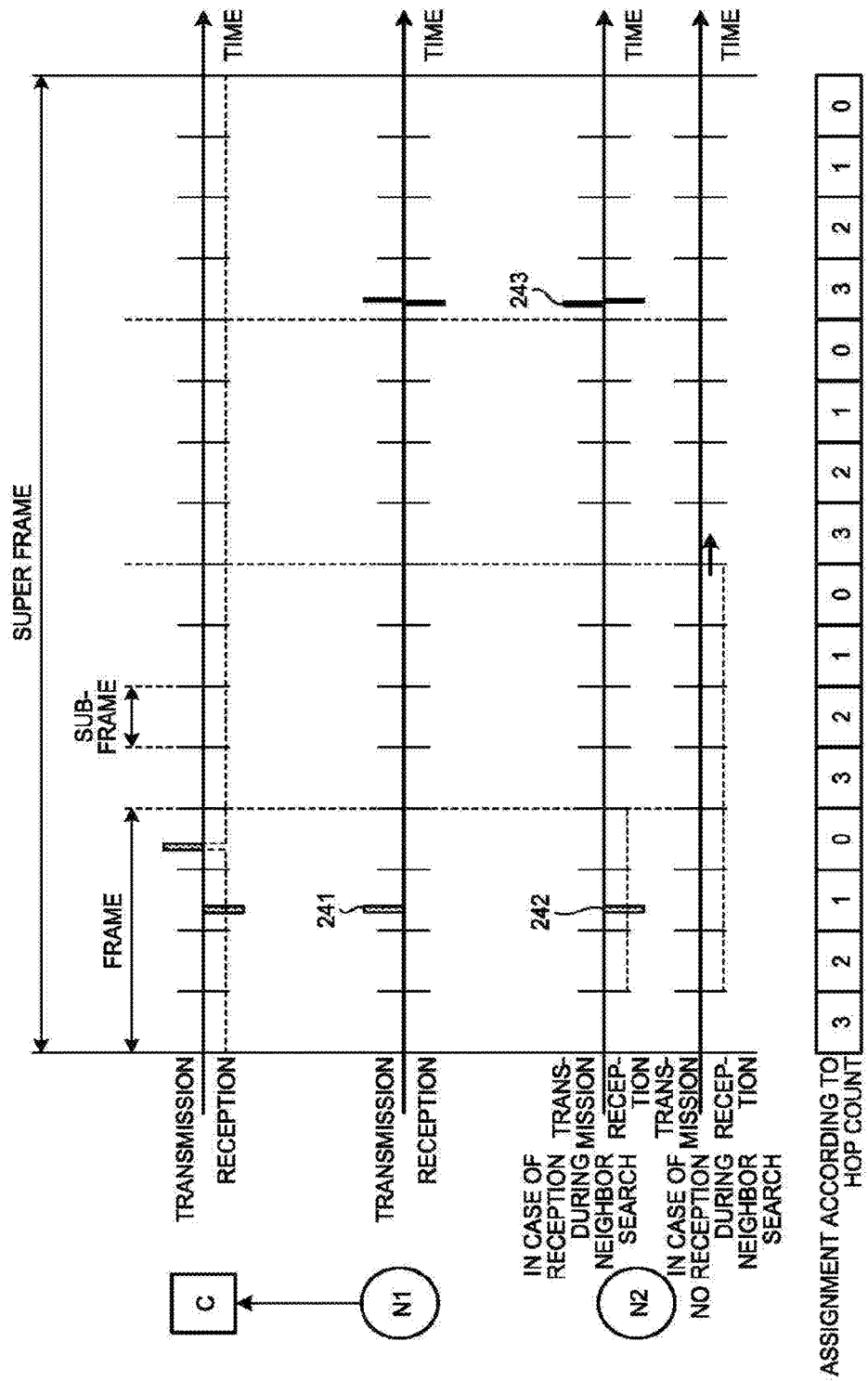

WIRELESS COMMUNICATION DEVICE AND WIRELESS COMMUNICATION SYSTEM

CROSS-REFERENCE TO RELATED APPLICATION

This application is based upon and claims the benefit of priority from Japanese Patent Application No. 2017-055912, filed on Mar. 22, 2017; the entire contents of which are incorporated herein by reference.

FIELD

An embodiment described herein relates generally to a wireless communication device and a wireless communication system.

BACKGROUND

Typically, wireless networks in which a plurality of wireless nodes is connected have been in use. In such a wireless network, examples of the implemented communication method include the time-division communication method.

However, there has been a demand for a wireless network that enables saving more electrical power during communication than in the past.

BRIEF DESCRIPTION OF THE DRAWINGS

FIG. 12 is a sequence diagram illustrating a second example of the communication control method according to the embodiment;

FIG. 13 is a sequence diagram illustrating a third example of the communication control method according to the embodiment;

FIG. 14 is a sequence diagram illustrating a fourth example of the communication control method according to the embodiment;

FIGS. 15A to 15C are sequence diagrams illustrating a first example of an initial destination search according to the embodiment;

FIGS. 16A to 16C are sequence diagrams illustrating a second example of the initial destination search according to the embodiment;

FIG. 19 is a sequence diagram for explaining an example of a destination search in response to the termination of connection of the wireless communication device according to the embodiment.

DETAILED DESCRIPTION

According to an embodiment, a wireless communication device performs time-division communication and includes a storage and one or more processors. The storage is configured to store transmission data to be sent in a first period of time. The one or more processors are configured to perform a transmission process of sending the transmission data in a first frame at start of a plurality of frames included in the first period of time, or perform a transmission process of sending a pieces of divided the transmission data in a plurality of successive frames beginning from the first frame and included in the first period of time. After the transmission process, the wireless communication device switches to sleep mode in one or more frames of the first period of time.

An exemplary embodiment of a wireless communication device and a wireless communication system is described below in detail with reference to the accompanying drawings.

EMBODIMENT

Firstly, the explanation is given about the embodiment.

Example of Device Configuration

Figure 1:
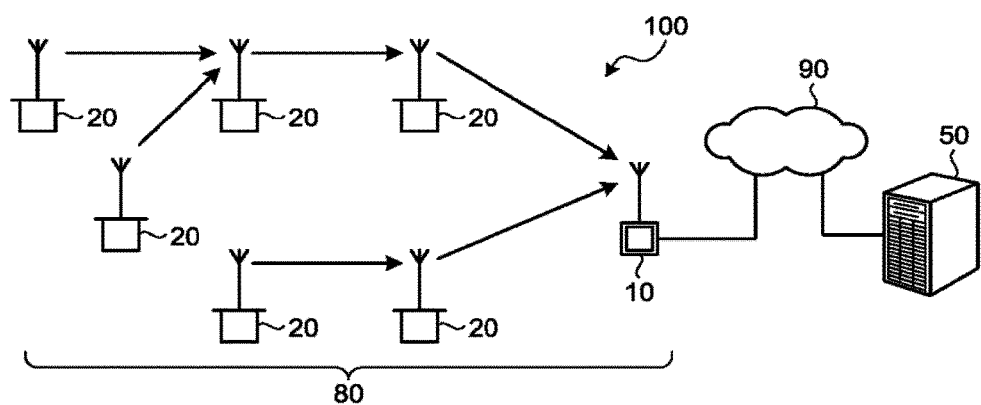
FIG. 1 is a diagram illustrating an exemplary device configuration of a wireless communication system according to an embodiment.

FIG. 1 is a diagram illustrating an exemplary device configuration of a wireless communication system 100 according to the embodiment. The wireless communication system 100 according to the embodiment includes an aggregation device 10, a plurality of wireless communication devices 20, and a server device 50. The aggregation device 10 and the wireless communication devices 20 constitute a network 80 in which the aggregation device 10 serves as the root node. In the example illustrated in FIG. 1, the network 80 is a wireless multihop network. The formation of the wireless multihop network illustrated in FIG. 1 is only exemplary, and is appropriately varied according to the situation.

The network 80 can have any arbitrary form. For example, the network 80 can be of the tree type or the mesh type. For example, the network 80 is a multihop network.

In the wireless communication system 100 according to the embodiment, the time-division communication method is implemented as the communication method.

Each wireless communication device 20 can perform wireless communication with the aggregation device 10 and other wireless communication devices 20 installed within a predetermined range. Each wireless communication device 20 has arbitrary sensors, such as a temperature sensor and an acceleration sensor, installed therein. Each wireless communication device 20 sends transmission information, which contains sensor information measured by the sensors, to other wireless communication devices 20. The transmission information sent by each wireless communication device 20 reaches the aggregation device 10 either via other wireless communication devices 20 or directly.

The aggregation device 10 aggregates the transmission information, which is sent by each wireless communication device 20, as aggregated information. The communication of the transmission information from the wireless communication devices 20 to the aggregation device 10 is called uplink, upstream communication, or simply upstream. Meanwhile, the aggregation device 10 is connected to the server device 50 via a network 90. Herein, the network 90 can be a wired network or a wireless network, or can be a combination of both types. The aggregation device 10 sends the aggregated information to the server device 50 in any arbitrary data format.

Upon receiving the aggregated information from the aggregation device 10, the server device 50 sores the aggregated information and performs arbitrary processes using the aggregated information.

Hereinafter, for the purpose of illustration, the aggregation device 10 and the wireless communication devices 20 constituting the network 80 are sometimes referred to as nodes. A node representing the destination for transmission is sometimes called a destination node, and a node representing the source of transmission is sometimes called a source node.

Given below is the explanation of an example of frames that represent the units of communication time in the network 80 according to the embodiment.

Example of Frames

Figure 2:
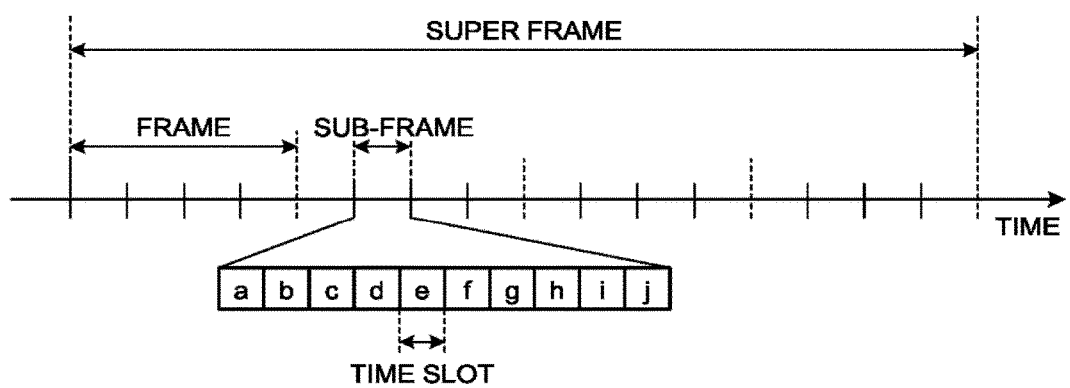
FIG. 2 is a diagram illustrating an example of frames representing the units of communication time according to the embodiment.

FIG. 2 is a diagram illustrating an example of frames representing the units of communication time according to the embodiment.

A super frame includes a plurality of frames. For example, a super frame represents the frequency at which sensor information is measurement by each wireless communication device 20. For example, sensor information acquired during a single measurement is sent in a single super frame to the aggregation device 10.

A frame includes a plurality of sub-frames. A sub-frame includes a plurality of time slots. A time slot represents the time interval that can be used for transmission by the corresponding wireless communication device 20. The number of time slots provided in a sub-frame is set, for example, to be equal to or greater than the number of wireless communication devices 20 included in the network 80. The time slots usable by each wireless communication device 20 can be assigned based on, for example, identification information enabling identification of the wireless communication device 20. Meanwhile, the frequency channels to be used for communication can be decided according to any method.

Meanwhile, the number of frames included in a super frame can be any arbitrary number. In an identical manner, the number of sub-frames included in a frame as well as the number of time slots included in a sub-frame can also be any arbitrary number.

Given below is the explanation of an example of a packet used in the network 80 according to the embodiment.

Example of Packet

Figure 3:
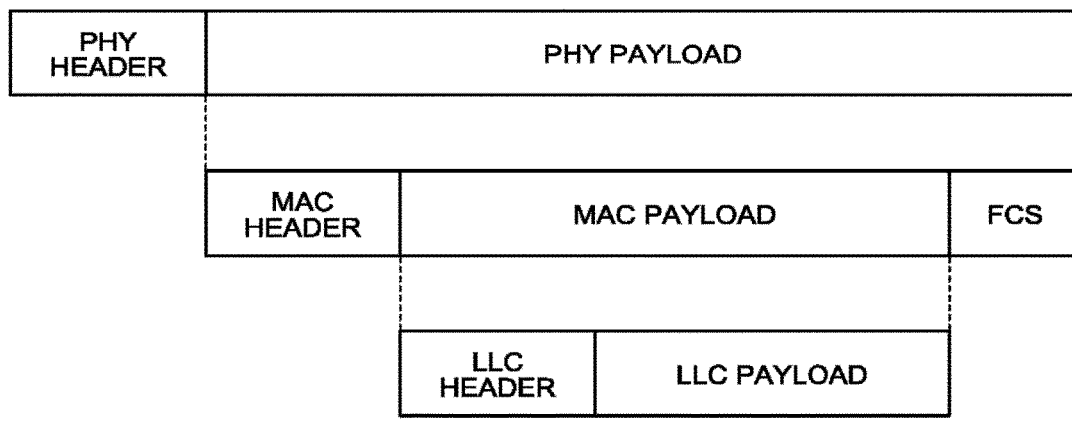
FIG. 3 is a diagram illustrating an example of a packet according to the embodiment.

FIG. 3 is a diagram illustrating an example of a packet according to the embodiment. Each packet used in the network 80 according to the embodiment includes a PHY header and a PHY payload (PHY stands for Physical). The PHY payload includes a MAC header, a MAC payload (MAC stands for Media Access Control), and an FCS (which stands for Frame Check Sequence). The MAC payload can further include an LLC header and an LLC payload (LLC stands for Logical Link Control). Moreover, the LLC payload can include a field for storing protocol information of higher levels.

The PHY header includes information such as the preamble sequence, the frame delimiter start position, and the frame length.

The MAC header includes information such as the frame control, the sequence number, and the address information.

The LLC or the field for storing information of higher-level protocols includes the message type, the hop count, the sensor information, and the relay path information along with the node IDs of the source node and the destination node that are set separately from the MAC. The message type represents, for example, information for distinguishing between control information, which is meant for building and maintaining the network 80, and the sensor information. Meanwhile, the LLC or the field for storing information of higher-level protocols can also include a variety of other information.

Moreover, in the embodiment, transmission continuation information is included after the MAC header. The transmission continuation information represents, for example, 1-bit information indicating true (continuation) or false (termination). Hereinafter, false (termination) is called an end flag (F flag).

Given below is the explanation of a hardware configuration of the aggregation device 10 and the wireless communication devices 20 according to the embodiment.

First Example of Hardware Configuration

Figure 4:
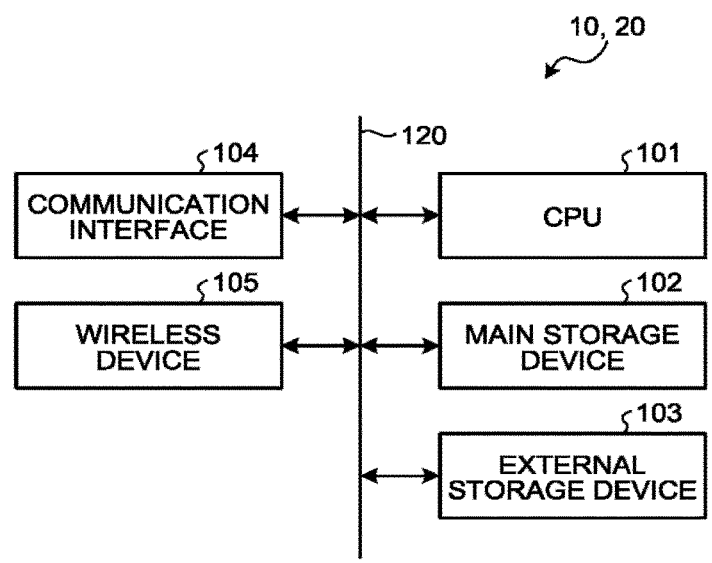
FIG. 4 is a diagram illustrating a first example of the hardware configuration of an aggregation device and wireless communication devices according to the embodiment.

FIG. 4 is a diagram illustrating a first example of the hardware configuration of the aggregation device 10 and the wireless communication devices 23 according to the embodiment. In the first example illustrated in FIG. 4, the aggregation device 10 as well as each wireless communication device 20 includes a central processing unit (CPU) 101, a main storage device 102, an external storage device 103, a communication interface 104, and a wireless device 105. The CPU 101, the main storage device 102, the external storage device 103, the communication interface 104, and the wireless device 105 are connected to each other by a bus 120.

The CPU 101 reads computer programs from a recording medium such as the external storage device 103, and executes the computer programs upon loading them in the main storage device 102.

The main storage device 102 is used to store computer programs, data required for the execution of the computer programs, and data generated as a result of executing the computer programs. The main storage device 102 can be any arbitrary device. Examples of the main storage device 102 include a random access memory (RAM), a dynamic random access memory (DRAM), and a static random access memory (SRAM).

The main storage device 102 is used to store the following information: computer programs, relay information, frame information, node ID, hop count, parent node, and child node. The relay information represents, for example, received information that is received from other nodes. More particularly, the relay information represents, for example, the sensor information acquired by other nodes. The parent node represents the node having the hop count to be smaller by one than the corresponding node; and represents the destination node described later. The child node represents the node having the hop count to be greater by one than the corresponding node; and represents the node for which the corresponding node is determined as the destination node.

Meanwhile, the main storage device 102 can also be used to store the operating system, the basic input-output system (BIOS), and a variety of middleware of the aggregation device 10.

The external storage device 103 is used to store computer programs, data required in the execution of the computer programs, and data generated as a result of executing the computer programs. At the time of execution of a computer program; that computer program and the relevant data gets loaded in the main storage device 102. The external storage device 103 can be any arbitrary device. Examples of the external storage device 103 include a hard disk, an optical disk, a flash memory, and a magnetic tape. The external storage device 103 is used to store the following information: computer programs, relay information, frame information, node ID, hop count, parent node, and child node.

Meanwhile, the computer programs that are executed in the aggregation device 10 and the wireless communication devices 20 can be, for example, installed in advance in the external storage device 103. Alternatively, for example, the computer programs that are sent from other devices to the aggregation device 10 via a different wired or wireless network can be stored and installed in the external storage device 103.

The communication interface 104 is a general-purpose interface (I/F) meant for communicating with external devices. Examples of the communication interface 104 include UART, I2C, SPI, CAN, RS232, and Ethernet (registered trademark) port.

The wireless device 105 enables the corresponding aggregation device 10 or the corresponding wireless communication device 20 to perform wireless communication with other devices. The aggregation device 10 and the wireless communication device 20 can include a plurality of wireless devices 105. For example, if the aggregation device 10 as well as each wireless communication device 20 includes two wireless devices 105, then the second wireless device 105 can send data collected by the first wireless device 105. Meanwhile, as long as the second wireless device 105 uses different radio frequencies than the first wireless device 105, it can be any arbitrary device. Examples of the second wireless device 105 include cellular communication and Wi-Fi (registered trademark).

Given below is the explanation of a second example of the hardware configuration of the aggregation device 10 and the wireless communication devices 20 according to the embodiment.

Second Example of Hardware Configuration

Figure 5:
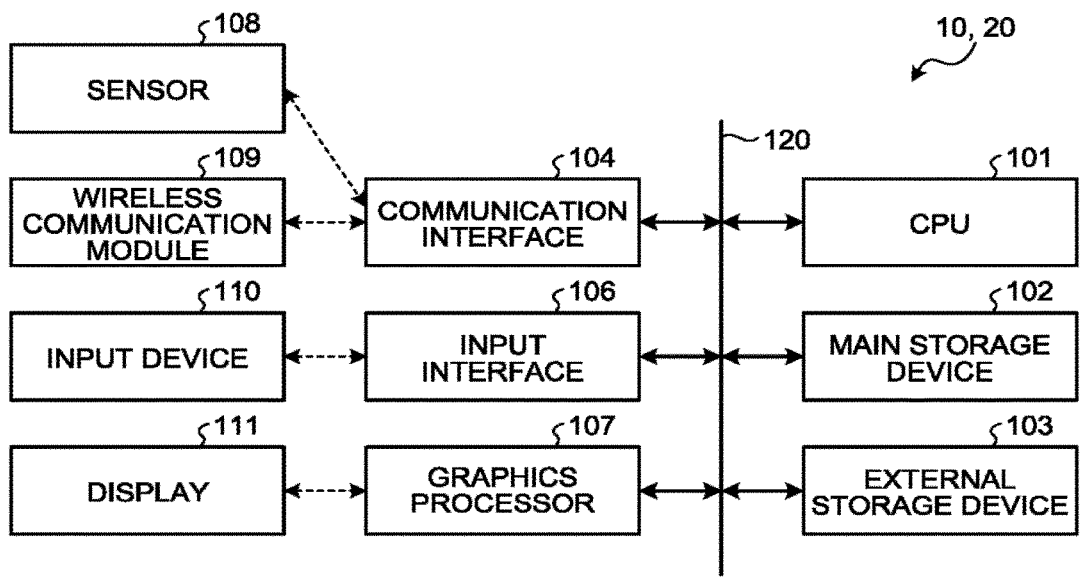
FIG. 5 is a diagram illustrating a second example of the hardware configuration of the aggregation device and the wireless communication devices according to the embodiment.

FIG. 5 is a diagram illustrating a second example of the hardware configuration of the aggregation device 10 and the wireless communication devices 20 according to the embodiment. In the second example illustrated in FIG. 5, the aggregation device 10 as well as each wireless communication device 20 includes the CPU 101, the main storage device 102, the external storage device 103, the communication interface 104, an input interface 106, and a graphics processor 107. Herein, the CPU 101, the main storage device 102, the external storage device 103, the communication interface 104, the input interface 106, and the graphics processor 107 are connected to each other by the bus 120.

Moreover, in the second example illustrated in FIG. 5, a sensor 108 and a wireless communication module 109 are connected to the communication interface 104. Furthermore, an input device 110 is connected to the input interface 106. Moreover, a display 111 is connected to the graphics processor 107.

Regarding the CPU 101, the main storage device 102, the external storage device 103, and the communication interface 104; the explanation is identical to the explanation given with reference to FIG. 4. Hence, the explanation is not repeated.

The input interface 106 receives, from the input device 110, an operation signal corresponding to an input operation received by the input device 110. The input device 110 can be any arbitrary device. Examples of the input device 110 include a keyboard and a mouse.

The graphics processor 107 displays videos and images on the display 111 based on video signals and image signals generated by the CPU 101. The display 111 can be any arbitrary device. Examples of the display 111 include a liquid crystal display (LCD), a cathode ray tube (CRT), and a plasma display panel (PDP).

The sensor 108 can be any arbitrary device. Examples of the sensor 108 include an ambient light sensor, a temperature-humidity sensor, an acceleration sensor, and an angular velocity sensor. Alternatively, the sensor 108 can be a pseudo sensor, which is, for example, a separate computer device that outputs data. Meanwhile, since the aggregation device 10 is meant for aggregating data from the wireless communication devices 20, the sensor 108 may not be included.

The wireless communication module 109 fulfils the role of the wireless device 105 illustrated in FIG. 4. The wireless communication module 109 does not always have an identical hardware configuration to the wireless device 105. Meanwhile, the aggregation device 10 as well as the wireless communication devices 20 can include a plurality of wireless communication modules 109 in an identical manner to the case of the wireless device 105 illustrated in FIG. 4.

The hardware illustrated in FIGS. 4 and 5 can have any arbitrary power source. Examples of the power source for the hardware illustrated in FIGS. 4 and 5 include a commercial power source, a battery, an electrical generator, and an electricity generation module.

However, since the power source of the wireless communication devices 20 is related to the power saving performance thereof, it is primarily assumed that the wireless communication devices 20 operate because of the energy supplied from a battery and an electricity generating element. However, even if a commercial power supply is used as the power source of the wireless communication device 20, the communication method according to the embodiment enables achieving the effect of holding down the power consumption.

Given below is the explanation of an exemplary functional configuration of the aggregation device 10 according to the embodiment.

Functional Configuration of Aggregation Device

Figure 6:
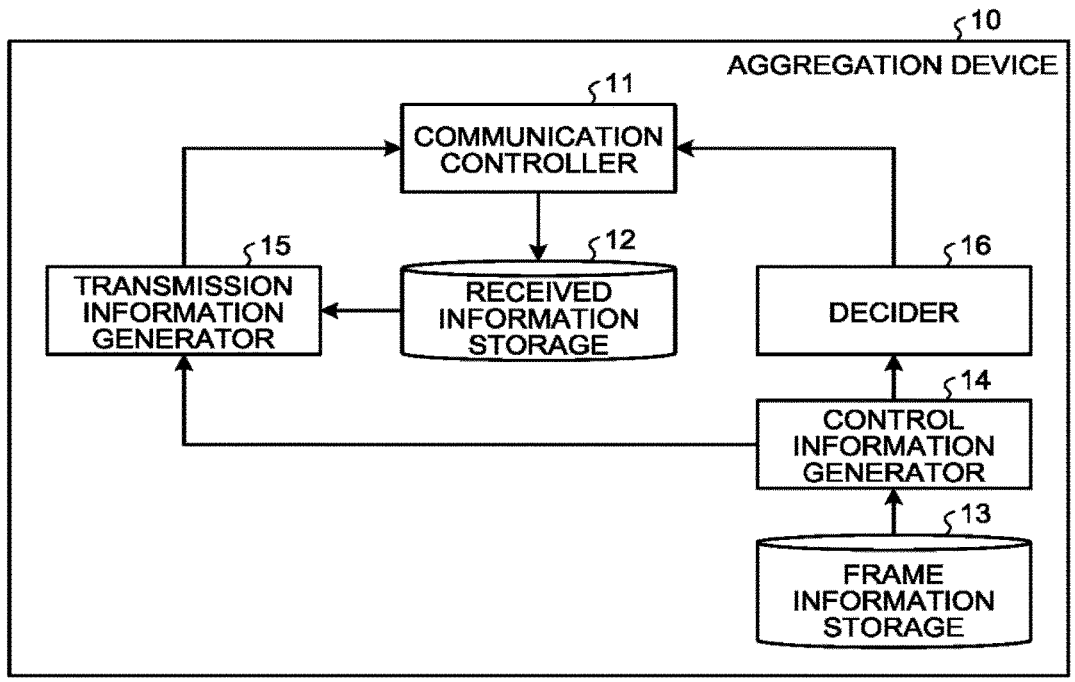
FIG. 6 is a diagram illustrating an exemplary functional configuration of the aggregation device according to the embodiment.

FIG. 6 is a diagram illustrating an exemplary functional configuration of the aggregation device 10 according to the embodiment. The aggregation device 10 sends a reference signal (beacon) that serves as the reference for the wireless communication devices 20 to measure the timing of communication. The aggregation device 10 aggregates the received information received from the wireless communication devices 20. According to the embodiment, the aggregation device 10 includes a communication controller 11, a received information storage 12, a frame information storage 13, a control information generator 14, a transmission information generator 15, and a decider 16.

The communication controller 11 converts received radio signals into electrical signals, performs predetermined signal processing with respect to the electrical signals, and retrieves received information from the radio signals. The signal processing can be any arbitrary processing. For example, the signal processing includes analog-to-digital (AD) conversion and decoding according to a predetermined communication protocol.

The received information at least contains the node ID of the source node, the hop count, the sensor information, the relay information, and the node ID of the destination node. A node ID represents identification information enabling identification of a wireless communication device. The node ID of the destination node as included in the received information either represents the node ID of the node to which the source node sends information or represents the node ID of the root node (the aggregation device 10).

Moreover, the communication controller 11 performs predetermined signal processing with respect to the transmission information generated by the transmission information generator 15, and converts the transmission information into electrical signals. The signal processing can be of any arbitrary type. For example, the signal processing includes AD conversion and encoding according to a predetermined communication protocol.

The transmission information contains, for example, the node ID of the corresponding node, the hop count, frame information, time information, and confirmation response information.

The frame information represents setting information of the super frame, the frames, the sub-frames, and the time slots explained above. For example, the frame information can be registered in advance in the aggregation device 10. Alternatively, for example, the frame information can be registered and updated from outside using a different wired or wireless network.

The method of setting the frame information can be any arbitrary method. For example, if the length of the super frame is set and if the number of frames is set, then the length of the frames gets decided. If the length of the frames is set and if the number of sub-frames is set, then the length of the sub-frames gets decided. If the length of the sub-frames is set and if the number of sub-frames is provided, then the length of the frames gets decided. If the length of the frames is set and if the number of frames is provided, then the length of the super frame gets decided. If the length of the time slots is set as a smaller time unit than the sub-frames; then the length of the super frame, the length of the frames, and the length of the sub-frames can be decided by referring to the information such as the number of time slots provided in a sub-frame with reference to the length of the time slots.

The time information represents the information indicating the time that serves as the basis for measuring the timing of communication. For example, the time information can be a value acquired by converting the standard time using some method. Alternatively, for example, the time information can be the frame number that, after the processes of the wireless communication system 100 are started, is counted up in the units of super frames or frames. Moreover, the time information can further contain the numbers assigned to the sub-frames in a frame; the numbers assigned to the time slots; and the elapsed-time information about the elapsed time from the beginning of a sub-frame to the start of transmission.

The received information storage 12 stores a plurality of sets of received information received from the source node, and aggregates the sets of received information (aggregated information). Herein, the received information can be stored in any arbitrary data format.

The control information generator 14 generates frame information and time information based on the frame information stored in the frame information storage 13.

When the time information is set to be the standard time, the control information generator 14 can use the time that is set manually, for example. Alternatively, for example, when the time information is set to be the standard time, the control information generator 14 can use the timing that is synchronized using the network time protocol (NTP) or the precision time protocol (PTP) via a different wired or wireless network. Still alternatively, when the time information is set to be the standard time and when the reception function of receiving an atomic clock is provided, the control information generator 14 can use the timing that is synchronized using the reception function.

The transmission information generator 15 generates transmission information based on the frame information and the time information generated by the control information generator 14. Moreover, the transmission information generator 15 can generate confirmation response information based on the received information stored in the received information storage 12, and can include the confirmation response information in the transmission information.

For example, the confirmation response information represents a series of bits in which, according to the reception result from each node as included in the last frame number, a bit is set in a one-to-one correspondence to each node.

The decider 16 decides, based on the frame information, the timing at which the corresponding node sends transmission information. Regarding the method of deciding the timing based on the frame information, the details are given later. Meanwhile, if a plurality of frequency channels is used, the selection of the frequency channels to be used in transmission and reception can be done according to any arbitrary method.

Given below is the explanation of an exemplary functional configuration of the wireless communication devices 20 according to the embodiment.

Functional Configuration of Wireless Communication Device

A wireless communication device includes a storage and a processor. The storage is used to store transmission data to be sent during a first period of time. The processor performs transmission processing of all transmission data in the first frame present at the beginning of a plurality of frames included in a super frame; or divides the transmission data among a plurality of successive frames, including the first frame, that are included in a super frame, and then performs transmission processing. Of the first period of time, in one or more frames after the transmission processing of the transmission data has been done, the wireless communication device switches to the sleep mode. The storage can be configured using at least either one of or both of a relay information storage 23 and a sensor information storage 30. The processor can be configured using a communication controller 21. Moreover, the processor can include the other constituent elements illustrated in FIG. 4.

Figure 7:
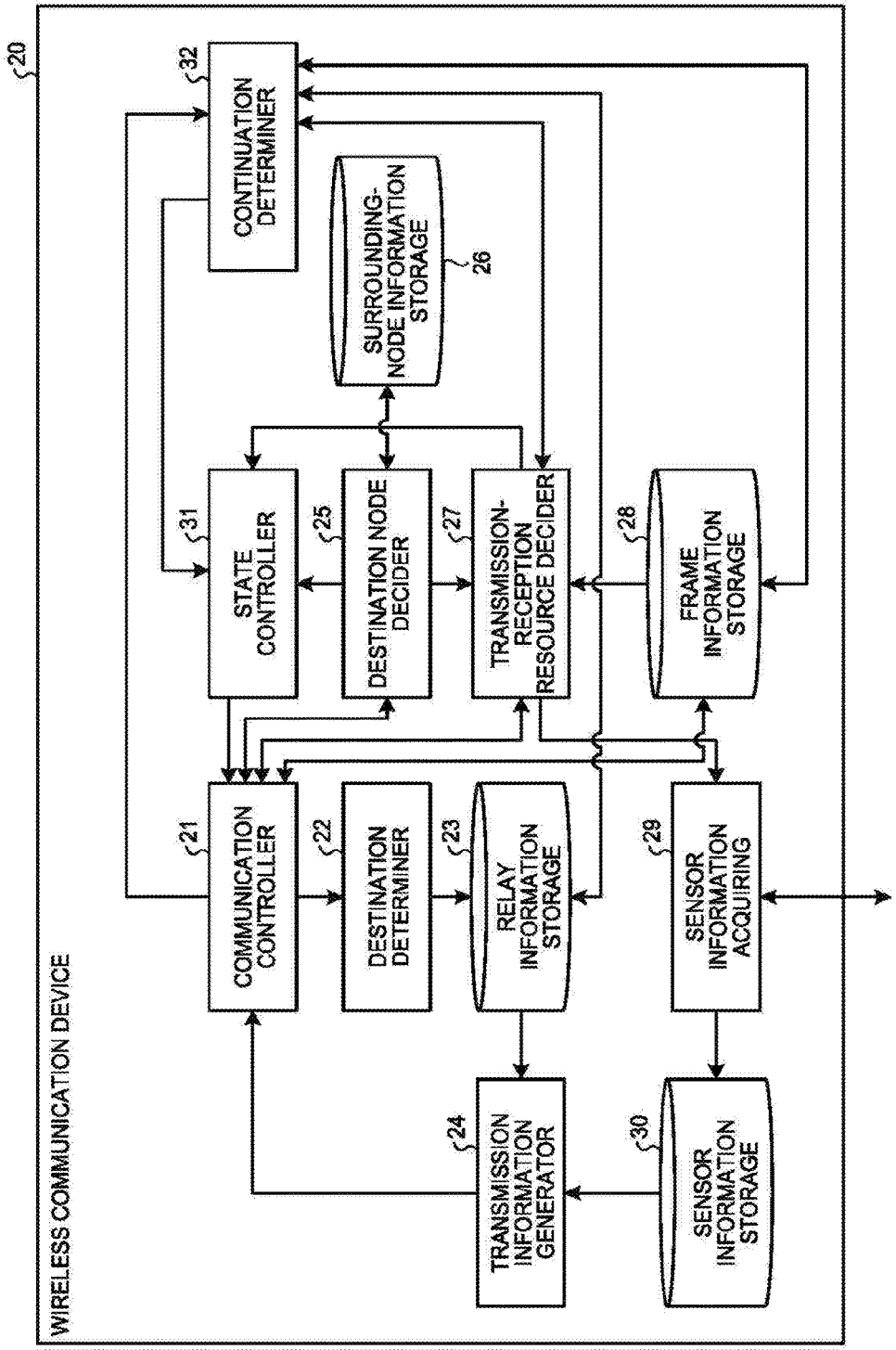
FIG. 7 is a diagram illustrating an exemplary functional configuration of the wireless communication device according to the embodiment.

FIG. 7 is a diagram illustrating an exemplary functional configuration of the wireless communication device according to the embodiment. The wireless communication device 20 according to the embodiment includes the communication controller 21, a destination determiner 22, the relay information storage 23, a transmission information generator 24, a destination node decider 25, a surrounding-node information storage 26, a transmission-reception resource decider 27, a frame information storage 28, a sensor information acquirer 29, the sensor information storage 30, a state controller 31, and a continuation determiner 32.

The communication controller 21 converts the received radio signals into electrical signals, performs predetermined signal processing with respect to the electrical signals, and retrieves received information from the radio signals. The signal processing can be of any arbitrary type. For example, the signal processing can include AD conversion and decoding according to a predetermined communication protocol.

The received information at least contains the node ID of the source node, the hop count, the sensor information, the relay information, and the node ID of the destination node. Regarding the received information, the explanation is identical to the explanation given earlier with reference to FIG. 6. Hence, that explanation is not repeated.

Moreover, the communication controller 21 perform predetermined signal processing with respect to the transmission information generated by the transmission information generator 15, and converts the transmission information into electrical signals. The signal processing can be of any arbitrary type. For example, the signal processing includes AD conversion and encoding according to a predetermined communication protocol.

The transmission information at least contains the hop count of the corresponding node, the node ID of the corresponding node, the relay information, and the node ID of the destination node. Regarding the relay information, the explanation is identical to the explanation given earlier with reference to FIG. 6. Hence, that explanation is not repeated.

The destination determiner 22 receives the received information from the communication controller 21, and determines whether or not the corresponding node represents the destination of the received information. More particularly, if the node ID of the destination node as specified in the received information is identical to the node ID of the corresponding node, then the destination determiner 22 determines that the corresponding node is the destination of the received information.

The relay information storage 23 temporarily stores, as relay information, such received information in which the corresponding node is determined as the destination by the destination determiner 22.

The transmission information generator 24 generates transmission information based on the relay information stored in the relay information storage 23 and the sensor information stored in the sensor information storage 30. The transmission information is generated by adding, to the relay information, the information such as the node ID of the corresponding node, the hop count of the corresponding node, the sensor information, and the node ID of the destination node. Then, the communication controller 21 sends the transmission information generated by the transmission information generator 24.

The destination node decider 25 receives the received information from the communication controller 21; and stores surrounding-node information, which is included in the received information, in the surrounding-node information storage 26. Then, based on the surrounding-node information stored in the surrounding-node information storage 26 either within a certain period of time or until a specified timing, the destination node decider 25 decides on destination node of the transmission information.

The surrounding-node information enables identification of the surrounding nodes of the corresponding node. For example, the surrounding-node information contains the node ID of the node that sent the received information; link information; the hop count; and path information. The link information contains, for example, an indicator of the communication quality; power information; and communication load information. The indicator of the communication quality is, for example, the reception power and the packet error rate. The power information is, for example, the remaining battery level and electricity production information. The communication load information is, for example, connection count information and the throughput.

The path information contains an indicator of the communication quality of the entire path; power information of the entire path; and communication load information. The indicator of the communication quality of the entire path is, for example, the expected transmission count (ETX) and the packet error rate. The power information of the entire path is, for example, the remaining battery level of some or all nodes in the path and a metric calculated from the electricity generated. The communication load information is, for example, the highest relay node count of the nodes in the path and the throughput value.

In the case of an uplink, the destination node functions as the parent node. The destination node decider 25 decides on the destination node based on the surrounding-node information stored in the surrounding-node information storage 26. In the case of only upstream communication, the destination node always functions as the parent node. For example, the destination node decider 25 decides that, from among the nodes for which the hop count included in the received information is smaller by one than the hop count of the corresponding node, the node having the highest signal intensity of radio signals as the destination node.

Moreover, the destination node decider 25 decides on the hop count of the corresponding node based on the decided destination node. For example, after deciding on the destination node according to the method described above, the destination node decider 25 sets the hop count of the corresponding node to be greater by one than the hop count of the destination node.

The transmission-reception resource decider 27 decides on, based on the frame information explained earlier, the transmission time (the time slots explained earlier) to be used by the corresponding node to send transmission information. Regarding the method for deciding on the transmission time, the details are given later. The frame information can be stored in advance in the frame information storage 28, or can be stored and updated in the frame information torage 28 using wireless communication.

The transmission-reception resource decider 27 can perform a synchronization process before deciding on the transmission time. In the synchronization process, the timing counted in the corresponding node is synchronized with the other nodes.

For example, the transmission-reception resource decider 27 decides on the transmission time of the source node (i.e., the reception time of the corresponding node) based on the hop count of the source node, the node ID of the source node, and the frame information included in the received information that is received by the communication controller 21. Then, the transmission-reception resource decider 27 can perform the synchronization process by comparing a first timing, which is acquired by adding the signal processing time taken by the communication controller 21 of the corresponding node and the start timing of the transmission time, with a second timing that is counted in the corresponding node.

The synchronization process can be performed according to any arbitrary method. For example, in the synchronization process, a correction value is either added to the second timing or subtracted from the second timing.

For example, the correction value is based on the result of calculating the frequency drift of a crystal oscillator according to the least-square method using the difference between the first timing and the second timing and using a sample value of the difference with respect to the passage of time. Moreover, the time required for the propagation of radio signals from the source node can be added to or subtracted from the correction value.

The transmission-reception resource decider 27 decides on the transmission timing and the reception timing of the corresponding node based on the hop count of the corresponding node, the node ID of the corresponding node, the frame information, and the continuation determination regarding transmission and reception as performed by the continuation determiner 32. Moreover, the transmission-reception resource decider 27 decides on the reception timing of the corresponding node based on the transmission timing of the parent node and the child node and based on the continuation determination regarding transmission and reception as performed by the continuation determiner 32.

The sensor information acquirer 29 decides on the timing of acquiring the sensor information with reference to the time slots decided by the transmission-reception resource decider 27. Then, the sensor information acquirer 29 acquires the sensor information from an external sensor device at the decided timing.

The sensor information storage 30 stores the sensor information acquired by the sensor information acquirer 29.

During the period of time in which electrical power is supplied, the state controller 31 remains functional regardless of the operating state of the wireless communication device 20. The state controller 31 counts the time and controls the operating state of the communication controller 21 between the sleep mode and the activated state based on the following: the counted time; the hop count of the corresponding node as decided by the destination node decider 25; and the transmission time and the reception time decided by transmission-reception resource decider 27.

In the sleep mode, for example, the arithmetic processing and the communication function of the wireless communication device 20 cease to function, and only the time is counted. In the sleep mode, since transmission and reception of information is not performed, there is a decline in the power consumption of the wireless communication device 20. In the following explanation, the state in which the wireless communication device 20 becomes able to send and receive information is called the activated state. Moreover, switching of the wireless communication device 20 from the activated state to the sleep mode is called "sleeping". Furthermore, switching of the wireless communication device 20 from the sleep mode to the activated state is called "waking up".

The continuation determiner 32 determines whether or not to continue subsequent transmission and reception in the super frame based on the frame information, the information of the connected child node, the received information from the child node, and the transmission result of transmission to the parent node. Regarding the detailed method of continuation determination, the explanation is given later.

Meanwhile, the configuration of the functional blocks explained above is only exemplary, and can be appropriately modified. For example, the communication controller 21 and the continuation determiner 32 can be implemented using a single functional block. Moreover, for example, the destination node decider 25 and the transmission-reception resource decider 27 can be implemented as a single decider.

Given below is the explanation of an example of the state transition of the wireless communication device 20 according to the embodiment.

Example of State Transition

Figure 8:
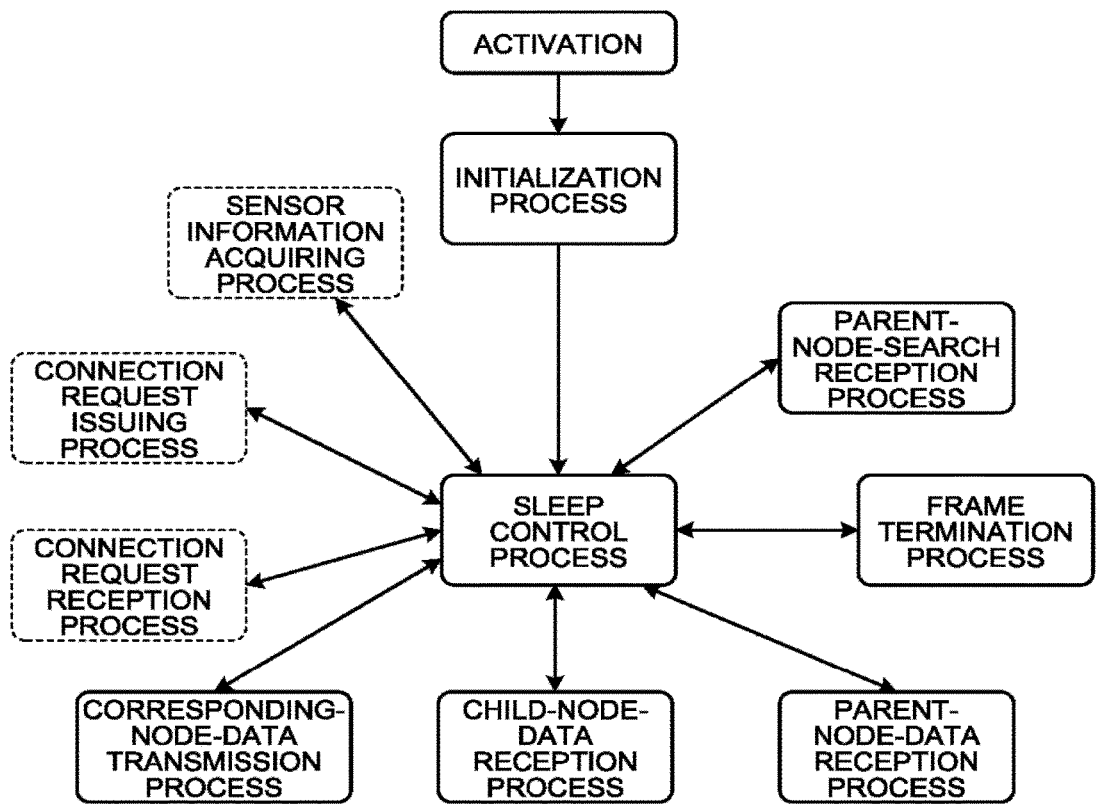
FIG. 8 is a diagram illustrating an example of transition of the processing states of the wireless communication device according to the embodiment.

FIG. 8 is a diagram illustrating an example of transition of the processing states of the wireless communication device 20 according to the embodiment.

In the wireless communication device 20, the following processes are performed: an initialization process, a sleep control process, a parent-node-search reception process, frame termination process, a parent-node-data reception process, a child-node-data reception process, a corresponding-node-data transmission process, a connection request reception process, a connection request issuing process, and a sensor information acquiring process. Herein, the connection request reception process, the connection request issuing process, and the sensor information acquiring process are optional processes performed as may be necessary.

In the wireless communication device 20, after the initialization process is performed upon activation, the sleep control process is performed.

The initialization process is performed to set initial values of hardware, interfaces, optional functions, software modules, and variables.

The sleep control process includes a process of acquiring the time to the next task, setting the interrupt period of the real-time clock (RTC), and setting the sleep mode; and includes a process in which, when activation is done using an RTC interrupt, resetting the interrupt period of the RTC.

The frame termination process includes processes corresponding to the information acquired in the current frame and registration of processes to be performed in the next frame. More particularly, the frame termination process includes a selection process for selecting the parent node at the destination, an adjustment process for adjusting the frame length, a synchronization process, an updating process for updating the frame number, and a returning process for returning the time slot numbers.

Moreover, at the end of a super frame, the frame termination process includes processes corresponding to the information acquired in the super frame and includes registration of processes to be performed in the next super frame. More particularly, at the end of a super frame, the frame termination process includes an addition process for adding tasks according to the selection of the parent node, an addition process for adding tasks according to the sensor, an adjustment process for adjusting the length of the super frame, an updating process for updating the super frame number, and a returning process for returning the frame numbers. The frame termination process is performed by the continuation determiner 32.

The parent-node-search reception process includes a corresponding-node activation process; reception standby; a reception process; and a process of storing the surrounding-node information, which is included in the received information, in the surrounding-node information storage 26.

The parent-node-data reception process includes a corresponding-node activation process; reception standby; a process of updating the frame configuration based on the acquired frame information; a process of acquiring synchronization information; and a synchronization process. Moreover, the parent-node-data reception process can further include a transmission process for sending a confirmation response signal that indicates the reception result.

The child-node-data reception process includes a corresponding-node activation process, reception standby, a reception process, and a process of storing the received information in the relay information storage 23. Moreover, the child-node-data reception process can further include a transmission process for sending a confirmation response signal that indicates the reception result.

The corresponding-node-data transmission process includes a corresponding-node activation process and a transmission data generation process. If the period of time of acquiring the sensor information is equal to or smaller than a threshold value, then the corresponding-node-data transmission process can also include a sensor information acquiring process. The transmission information sent during the corresponding-node-data transmission process is sent using the packets explained earlier (see FIG. 3). Moreover, in the corresponding-node-data transmission process, a confirmation response reception process can also be performed; and the transmission data can be cleared according to the details of the confirmation response and the transmission process can be again performed. That is, if a confirmation request indicating failure in the reception by the parent node, then the processor can again perform the transmission process to send the already-sent transmission data.

The sensor information acquiring process includes a corresponding-node activation process and a process of storing sensor information, which is acquired in a period of time equal to or greater than a threshold value, in the sensor information storage 30. The sensor information acquirer process can also include a process of storing time information, which indicates the period of time of acquiring the sensor information, in a corresponding manner to the sensor information in the sensor information storage 30. The time information can be the super frame numbers, the frame numbers, the sub-frame numbers, or the time slot numbers.

The connection request transmission process includes a corresponding-node activation process; a process of generating a connection request of the type of the intended connection; a process of sending the connection request to the node determined by the destination node decider 25; a reception process for receiving a confirmation response signal with respect to the connection request; and a process corresponding to the reception result of the confirmation response signal.

The connection request reception process includes a corresponding-node activation process; reception standby; and a child-node reception task registration process. Moreover, the connection request reception process can also include a process of sending the reception result in the form of a confirmation response signal.

Given below is the explanation of the examples of a communication control method according to the embodiment.

First Example of Communication Control Method

Figure 9:
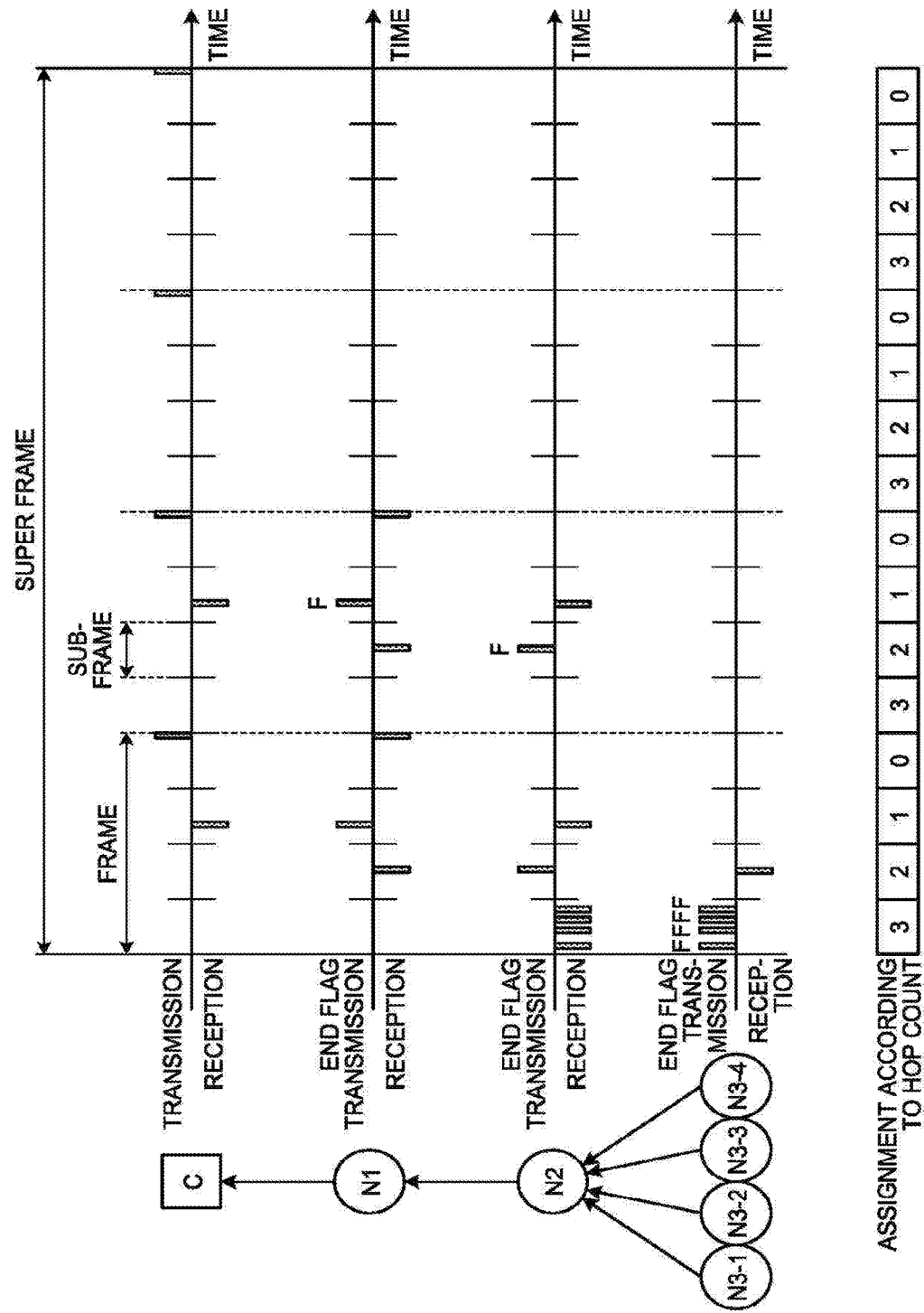
FIG. 9 is a sequence diagram illustrating a first example of a communication control method according to the embodiment.

FIG. 9 is a sequence diagram illustrating a first example of the communication control method according to the embodiment. In the example illustrated in FIG. 9, the explanation is given about the processes performed in the state attained after the end of the initial connection of the wireless communication device 20. Regarding the processes performed at the time of establishing the initial connection, the explanation is given later.

In FIG. 9, for the purpose of illustration, C represents the aggregation device 10 and N represents the wireless communication device 20. Moreover, Nx (where $1 \leq x \leq 3$ holds true) represents the wireless communication device 20 having the hop count of x. Meanwhile, in the example illustrated in FIG. 9, since there are four wireless communication devices 20 having the hop count of three, they are distinguished using Nx-y (where $1 \leq y \leq 4$ holds true).

In the example illustrated in FIG. 9, the super frame includes four frames. Moreover, each frame includes four sub-frames. Herein, regarding a plurality of wireless communication devices included in the wireless communication system, all of the transmission data in the super frame is aggregated in the aggregation device.

In the example illustrated in FIG. 9, the transmission-reception resource decider 27 decides on the sub-frames to be assigned to each node using, for example, the remainder acquired by dividing the hob count of the concerned node by the number of sub-frames included in a frame.

The first sub-frame included in each frame is assigned to a node having the hop count of three (to one of the nodes N3-1 to N3-4) by the transmission-reception resource decider 27.

The second sub-frame included in each frame is assigned to the node having the hop count of two (a node N2) by the transmission-reception resource decider 27.

The third sub-frame included in each frame is assigned to the node having the hop count of one (a node N1) by the transmission-reception resource decider 27.

The fourth sub-frame included in each frame is assigned to the node having the hop count of zero (the node C) by the transmission-reception resource decider 27. That is, the aggregation device 10 is considered to have the hop count of zero and, in the example illustrated in FIG. 9, the last time slot is assigned to the aggregation device 10.

The correspondence between the sub-frames and the hop counts is not limited to the example illustrated in FIG. 9. However, as a result of the assignment illustrated in FIG. 9, the delay time of relay transmission in the upstream communication from each node to the aggregation device 10 can be ensured to be within the period of time calculated based on the hop count.

Meanwhile, the time slots included in each sub-frame are assigned to each node (the node C and the nodes N1 to N3-4) by the transmission-reception resource decider 27 based on the identification information of the nodes.

Each node shares frame information in the form of the number of frames per super frame, the number of sub-frames per frame, and the number of time slots per sub-frame. Thus, the transmission-reception resource decider 27 of each node can refer to the corresponding node ID and autonomously decide on the time slots usable in the transmission by the corresponding node, as well as can refer to the hop count and autonomously decide on the sub-frames usable in the transmission by the corresponding node.

In the example illustrated in FIG. 9, in the initial frame of the super frame, the transmission information sent by the nodes having the hop count of three (the nodes N3-1 to N3-4) is received by the node having the hop count of two (the node N2). Then, the node having the hop count of two (the node N2) sends transmission information containing the sensor information of the corresponding node and the sensor information of the child nodes to the node having the hop count of one (the node N1). However, the node having the hop count of two (the node N2) is not able to completely send all of the transmission information, and sends the unsent transmission information in the next frame. Since the nodes having the hop count of three (the nodes N3-1 to N3-4) have completed the transmission in the initial frame, they switch to the sleep mode without having to wake up for transmission or reception in the second frame. In the third frame onward, the node having the hop count of two (the node and the node having the hop count of one (the node N1) too can switch to the sleep mode without having to wake up for transmission or reception. As a result, it becomes possible to achieve a bare minimum activation count for relay transmission.

Given below is the detailed explanation of the example illustrated in FIG.

In the first sub-frame included in the first frame, the transmission information of the nodes having the hop count of three (the nodes N3-1 to N3-4) is sent to the node having the hop count of two (the node N2). In the example illustrated in FIG. 9, since an end flag (F) is assigned to the transmission information, the transmission process performed by the nodes having the hop count of three (the nodes N3-1 to N3-4) ends in the first frame.

In the second sub-frame included in the first frame, the transmission information of the node having the hop count of two (the node N2) is sent to the node having the hop count of one (the node N1) and the nodes having the hop count of three (the nodes N3-1 to N3-4). In the example illustrated in FIG. 9, since the end flag (F) is not assigned to the transmission information, the transmission process performed by the node having the hop count of two (the node N2) is performed in the second frame too. Meanwhile, the nodes having the hop count of three (the nodes N3-1 to N3-4) receive the transmission information sent in the second sub-frame of the first frame, and thus confirm that the transmission process performed in the first sub-frame of the first frame has ended in a normal way.

In the third sub-frame of the first frame, the transmission information of the node having the hop count of one (the node N1) is sent to the node having the hop count of zero (the node C) and the node having the hop count of two (the node N2). In the example illustrated in FIG. 9, since the end flag (F) is not assigned to the transmission information, the transmission process performed by the node having the hop count of one (the node N1) is performed in the second frame too. Meanwhile, the node having the hop count of two (the node N2) receives the transmission information sent in the third sub-frame of the first frame, thereby confirming that the transmission process performed in the second sub-frame of the first frame has ended in a normal way.

In the second sub-frame included in the second frame, the transmission information of the node having the hop count of two (the node N2) is sent to the node having the hop count of one (the node N1). In the example illustrated in FIG. 9, since the end flag (F) is assigned to the transmission information, the transmission process performed by the node having the hop count of two (the node N2) ends in the second sub-frame.

In the third sub-frame included in the second frame, the transmission information of the node having the hop count of one (the node N1) is sent to the node having the hop count of zero (the node C) and the node having the hop count of two (the node N2). In the example illustrated in FIG. 9, since the end flag (F) is assigned to the transmission information, the transmission process performed by the node having the hop count of one (the node N1) ends in the third sub-frame. Meanwhile, the node having the hop count of two (the node N2) receives the transmission information sent in the third sub-frame of the second frame, thereby confirming that the transmission process performed in the second sub-frame of the second frame has ended in a normal way.

In the fourth sub-frame of each frame, the node having the hop count of zero (the node C) sends a reference signal.

The state controller 31 of each node switches to the sleep mode in the time slots other than the time slots used by the corresponding node to perform a transmission process or a reception process. More particularly, in the super frame, the sleep mode is attained in the frames present after the transmission process for sending transmission information has been performed. Greater the hop count of a wireless communication device with respect to the aggregation device, the earlier is the frame within the first period of time in which the sleep mode is attained. As a result, the power consumption of the nodes can be reduced.

Given below is the explanation of an example of the method by which the wireless communication device 20 according to the embodiment receives the received information from the child node.

Figure 10:
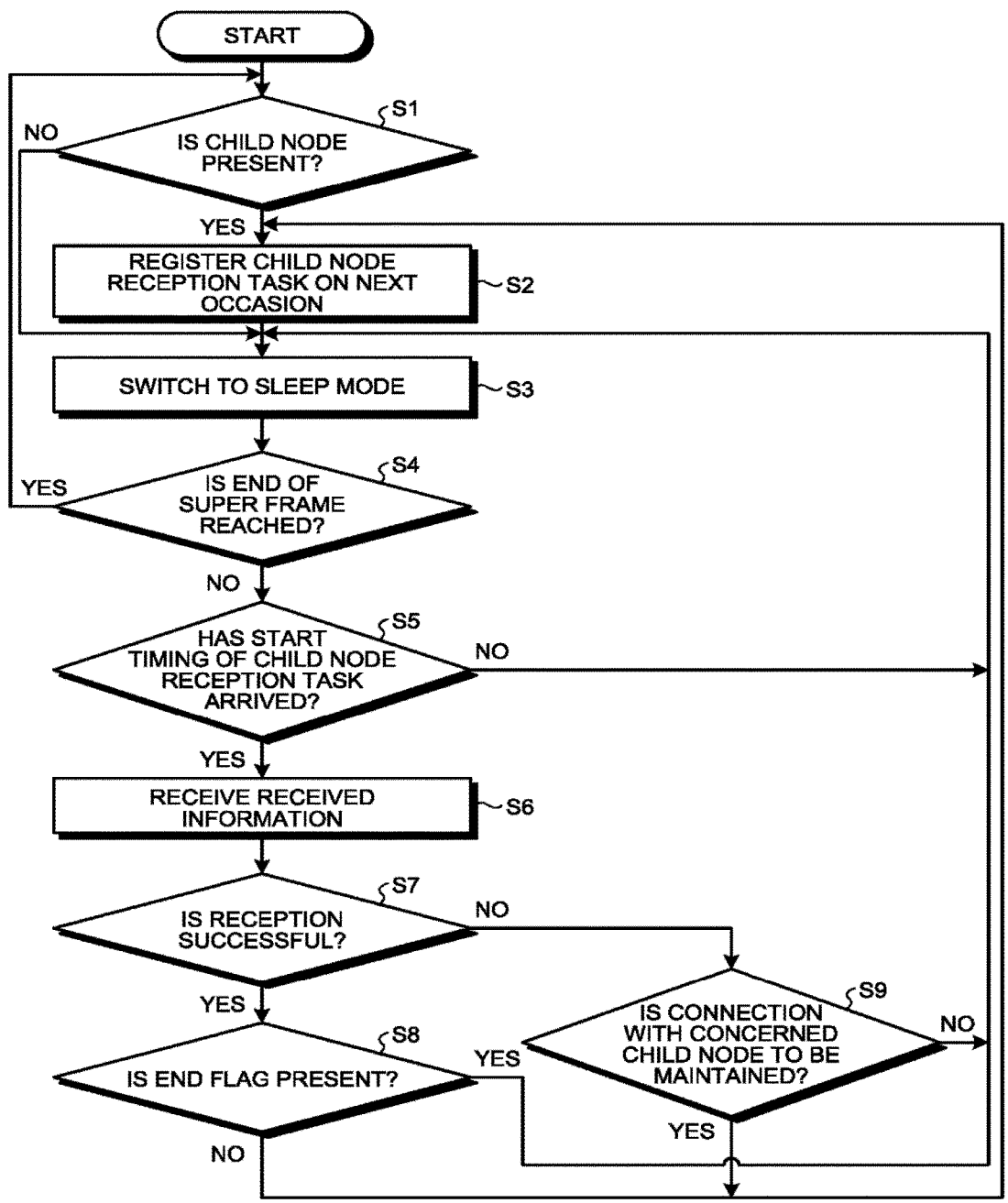
FIG. 10 is a flowchart for explaining an example of a method by which the wireless communication device according to the embodiment receives received information from a child node.

FIG. 10 is a flowchart for explaining an example of the method by which the wireless communication device 20 according to the embodiment receives the received information from a child node. With reference to FIG. 10, the explanation is given for a method for receiving the received information from a child node after the child node has established connection with the corresponding node. Hence, with reference to FIG. 10, neither the explanation about the method for receiving the received information from the parent node is given nor the explanation about the method for sending and receiving control data for the purpose of establishing connection with the parent node is given. Regarding the method for receiving the received information from the parent node and the method for establishing connection with the parent node, the explanation is given later.

The flowchart illustrated in FIG. 10 starts at the start timing or end timing of a super frame. As far as the reception is concerned, if there is no child node connected to the corresponding node, the wireless communication device 20 switches to the sleep mode and does not receive from any child node till the end of the super frame.

Firstly, the state controller 31 determines whether or not there is a child node connected to the corresponding node (Step S1). If there is a child node (Yes at Step S1), then the state controller 31 registers a child node reception task for receiving the received information from the child node on the next occasion (Step S2). However, if there is no child node (No at Step S1), then the system control proceeds to Step S3.

The timing of the child node reception task is decided according to the hop count of the child node and the node ID of the child node. With respect to the child nodes whose connection has been accepted, the state controller 31 registers the child node reception task of each child node and switches the corresponding node to the sleep mode until the start timing of the next child node reception task (Step S3).

Subsequently, the state controller 31 determines whether or not the operation timing has reached the end of the super frame (Step S4). If the process timing has reached the end of the super frame (Yes at Step S4), then the system control returns to Step S1 for the purpose of resetting the reception state of the transmission continuation information of the child node. On the other hand, if the process timing has not reached the end of the super frame (No at Step S4), the system control proceeds to Step S5.

Then, the state controller 31 determines whether or not the start timing of the child node reception task has arrived (Step S5). If the start timing of the child node reception task has not arrived (No at Step S5), the sleep mode is maintained (Step S3).

When the start timing of the child node reception task arrives (Yes at Step S5), the state controller 31 activates the corresponding node from the sleep mode using an RTC interrupt and keeps the communication controller 21 on reception standby. With that, the communication controller 21 performs a reception process (Step S6).

Subsequently, during reception standby, if the received information is successfully received from the child node (Yes at Step S7), then the received information is stored as relay information in the relay information storage 23. Then, the communication controller 21 checks whither or not information indicating continuation or termination of the transmission (i.e., an end flag) is included in the transmission header information (Step S8).

If the end flag (F) is included (Yes at Step S8), then the system control returns to Step S3. That is, the state controller 31 switches to the sleep mode without registering the child node reception task in the concerned super frame.

If the end flag (F) is not included (Ho at Step S9), then the system control returns to Step S2. That is, the state controller 31 registers the child node reception task for the next occasion and then switches to the sleep mode. Herein, the next occasion implies the next frame, for example.

Meanwhile, the registration of a child node reception task can be performed at any timing till the time when the concerned child node gets the next opportunity for transmission. For example, the state controller 31 stores the presence or absence of the end flag for each child node, and can later register the child node reception tasks at the same timing. More particularly, the state controller 31 can temporarily switch the corresponding node to sleep mode and, when the corresponding node is activated at the end or the start of a frame, can collectively register the child node reception tasks of the child nodes that continue with the transmission.

A child node reception task is not limited to the period of time of a single time slot, and the period of time can be set by taking into account the period of time required for the prior reception process or the period of time required for the prior processes or subsequent processes of the reception process.

Meanwhile, during reception standby, if the received information is not successfully received from the child node (No at Step S7), the communication controller 21 determines whether or not to maintain the connection with the concerned child node (Step S9).

If the connection is to be maintained (Yes at Step S9), then the system control returns to Step S2. That is, only when the connection with a child node is maintained, the state controller 31 registers the child node reception task for the next occasion for that child node.

If the connection is not to be maintained (No at Step S9), then the system control returns to Step S3.

At Step S9, for example, only when the number of times for which success in reception cannot be confirmed is smaller than a specific count, the state controller 31 registers the child node reception task.

On the other hand, if success in reception cannot be confirmed for a number of times equal to or greater than the specific count, the communication controller 1 performs a disconnection process for terminating the connection with the concerned child node. The disconnection process includes a process of determining whether or not to terminate the connection with the child node and a process in which, when the connection with the child node is terminated, the information about that child node is deleted from the surrounding-node information storage 26. After the disconnection process for terminating the connection with the child node has been performed by the communication controller 21, the state controller 31 switches the corresponding node to the sleep mode without registering the child node reception task of the concerned child node.

Meanwhile, the process at Step S9 may be skipped. For example, during the period of time of a child node reception task, if there is failure in reception or if reception was not confirmed, then the state controller 31 can register the child node reception task on the next occasion for the concerned child node at all times.

Moreover, at Step S8 explained earlier, even if the end flag is included in the received information that is received from a child node, if the child node reception task is registered for a further specific number of times and if the transmission signal of the concerned child node is received during the child node reception task, then the state controller 31 can register a transmission task with the aim of sending a confirmation response. That is done for avoiding unnecessary power consumption of the child node attributed to continuing with the transmission because of not being able to receive the transmission signal from the corresponding node and not being able to perform arrival confirmation. Meanwhile, as a substitute method, without registering the child node reception task, the state controller 31 registers the transmission task only for a specific number of times and sends only a confirmation response.

Given below is the explanation of an example of the method of sending the transmission information to the parent node and the method of receiving the received information from the parent node.

Figure 11:
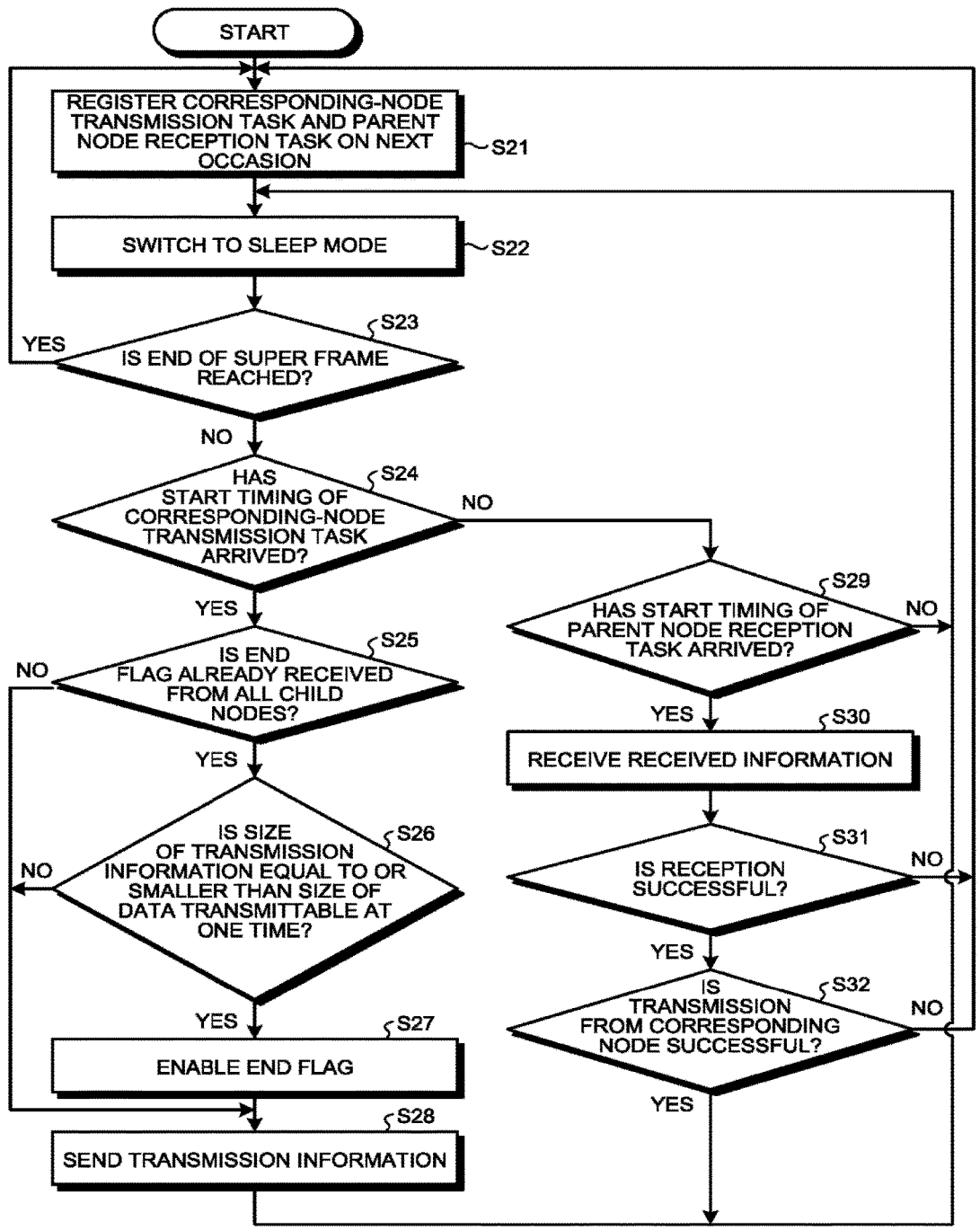
FIG. 11 is a flowchart for explaining a method of sending transmission information to the parent node and a method of receiving received information from the parent node as implemented by the wireless communication device according to the embodiment.

FIG. 11 is a flowchart for explaining the method of sending the transmission information to the parent node and the method of receiving the received information from the parent node as implemented by the wireless communication device according to the embodiment. In an identical manner to FIG. 10, the flowchart illustrated in FIG. 11 starts at the start timing or the end timing of the super frame present after the establishment of the connection with the parent node.

Firstly, the state controller 31 registers a corresponding-node transmission task for sending the transmission information from the corresponding node and a parent node reception task of receiving the received information from the parent node on the next occasion (Step S21). At the start timing or the end timing of the super frame, the next occasion implies timing within the initial frame of the super frame.

The start timing of the corresponding-node transmission task is decided according to the hop count of the corresponding node and the node ID of the corresponding node as explained earlier. Regarding the parent node reception task too, the start timing is decided according to the hop count of the parent node and the node ID of the parent node. Then, the state controller 31 switches e corresponding node to the sleep mode till the next task start timing (Step S22).

Subsequently, the state controller 31 determines whether or not the operation timing has reached the end of the super frame (Step S23). If the process timing has reached the end of the super frame (Yes at Step S23), then the system control returns to Step S21. At that time, at the end or the start of the super frame, the continuation determiner 32 can initialize the transmission continuation information to information not indicating end of transmission (i.e., true (continuation)).

Meanwhile, if the process timing has not reached the end of the super frame (No at Step S23), the system control proceeds to Step S24.

Corresponding-Node Transmission Task

Subsequently, the state controller 31 determines whether or not the start timing of the corresponding-node transmission task has arrived (Step S24). If the start timing of the corresponding-node transmission has not arrived (No at Step S24), the system control proceeds to Step S29.

When the start timing of the corresponding-node transmission arrives (Yes at Step S24), the communication controller 21 wakes up due to an RTC interrupt and starts a transmission process for sending transmission information. More particularly, when the received information received from the child node is stored in the relay information storage 23, the transmission information generator 24 forms a single packet by combining the received information with the sensor information of the corresponding node. The sensor information is stored in the sensor information storage 30, for example. Moreover, the transmission information generator 24 adds transmission continuation information to the header information of the packet.

Then, the continuation determiner 32 determines whether or not, in the concerned super frame, the end flag has been received from all child nodes (Step S25). If the end flag is not yet received from all child nodes (No at Step S25), then the system control proceeds to Step S28.

When the end flag has been received from all child nodes (Yes at Step S25), the continuation determiner 32 determines whether or not the size of the transmission information is equal to or smaller than the data size transmittable at one time (Step S26). If the size of the transmission information is not equal to or smaller than the data size transmittable at one time (No at Step S26), then the system control proceeds to Step S28.

When the size of the transmission information is equal to or smaller than the data size transmittable at one time (Yes at Step S26), the transmission information generator 24 enables the end flag of the transmission continuation information that is included in the transmission information (step S27). The condition for being able to send the transmission information at one time is as follows: for example, if only a single packet is to be sent during the period of time of the corresponding node transmission task, the sensor information of the corresponding node and the sensor information of the child node as stored in the relay information storage 23 can be fit together within a single packet.

Meanwhile, if no child node is connected to the corresponding node, then the condition for being able to send the transmission information at one time is that the target data for transmission of the corresponding node (such as the sensor information acquired in the corresponding node) can be fit within a single packet.

Subsequently, the communication controller 21 sends the transmission information to the parent node (Step S28). Then, the state controller 31 switches the corresponding node to the sleep mode (Step S22). Meanwhile, the communication controller 21 can immediately receive a confirmation response in the corresponding-node transmission task and, according to the confirmation processing result of the confirmation response, can again perform transmission during the period of time of the same corresponding-node transmission task.

Parent Node Reception Task

The state controller 31 determines whether or not the start timing of the parent node reception task has arrived (Step S29). If the start timing of the parent node reception task has not arrived (No at Step S29), then the system control returns to Step S22.

When the start timing of the parent node reception task arrives (Yes at Step S29), the communication controller 21 wakes up due to an RTC interrupt and switches to reception standby. Then, the communication controller 21 receives the received information from the parent node (Step S30).

Subsequently, the communication controller 21 determines whether or not the received information is successfully received (Step S31). If the received information has not been successfully received (No at Step S31), then the system control returns to Step S21. That is, the state controller 31 registers the corresponding-node transmission task and the parent node reception task for the next occasion (Step S21) and switches the corresponding node to the sleep mode (Step S22).

On the other hand, if the received information has been successfully received (Yes at Step S31), then the communication controller 21 determines whether or not the transmission information sent in the previous corresponding-node transmission task has been successfully sent (Step S32). More particularly, for example, the communication controller 21 refers to the received information received from the parent node (i.e., the transmission information sent by the parent node) and determines whether or not the transmission information sent in the previous corresponding-node transmission task has been successfully sent.

If the transmission information has not been successfully sent (No at Step S32), then the system control returns to Step S21. That is, the state controller 31 registers the corresponding-node transmission task and the parent node reception task for the next occasion (Step S21) and switches the corresponding node to the sleep mode (Step S22).

On the other hand, if the transmission information has been successfully sent (Yes at Step S32), then the system control returns to Step S22. At that time, the communication controller 21 deletes the transmission information, whose arrival at the parent node has been confirmed, from the transmission buffer (or from the relay information storage 23 and the sensor information storage 30).

In the explanation given with reference to FIG. 11, the next occasion implies the next frame, for example. Meanwhile, after the corresponding node once switches to the sleep mode and then wakes up at the end or at the start of a frame, the state controller 31 can register the corresponding-node transmission task and the parent node reception task. As long as the corresponding-node transmission task is registered till the corresponding node gets the next opportunity for transmission, the registration can be done at any arbitrary timing. In an identical manner, as long as the parent node reception task is registered till the parent node gets the next opportunity for transmission, the registration can be done at any arbitrary timing.

Meanwhile, if the reception from the parent node ends up in failure for a specific number of times or more, the communication controller 21 can determine to terminate the connection and perform a reconnection process. The explanation about the reconnection process is given later with reference to FIG. 19.

Moreover, depending on the correspondence between the hop count and the sub-frames according to the embodiment, there are also times when a parent node reception task is performed earlier than a corresponding-node transmission task.

Second Example of Communication Control Method

FIG. 12 is a sequence diagram illustrating a second example of the communication control method according to the embodiment. In the example illustrated in FIG. 12, a node having the hop count of four (a node N4) is added to the network topology illustrated in FIG. 9. The node having the hop count of four (the node N4) has the node N3-2 serving as the parent node.

In the example illustrated in FIG. 12, the node having the hop count of three (the node N3-2) sends transmission information 201 in the initial sub-frame of the super frame, but has not yet received the received information of the child node (the node N4) with which a connection has been confirmed. Hence, in the transmission continuation information that is included in the transmission information 201 sent by the node having the hop count of three (the node N3-2), the end flag is not yet enabled.

The node having the hop count of three (the node N3-2) receives received information 203 (transmission information 202 containing the end flag) from the child node (the node N4) in the fourth sub-frame (the last sub-frame) of the initial frame. Then, at the next opportunity for transmission, that is, in the first sub-frame of the second frame of the super frame, the node having the hop count of three (the node N3-2) sends transmission information 204, which contains the sensor information and the end flag included in the received information received from the child node (the node N4), to the node having the hop count of two (the node N2). In this specific example, it is illustrated that, even if the initial opportunity for transmission given to the child node in a super frame is after the opportunity for transmission given to the parent node, relay transmission and appropriate sleeping (i.e., activation only for bare minimum transmission and reception) can still be achieved.

Moreover, in the example illustrated in FIG. 12, it is illustrated that there occurs saturation in the memory area of the relay transmission buffer (the relay information storage 23) of the node having the hop count of two (the node N2), and that the reception of one of the nodes having the hop count of three (i.e., the node N3-4) is cancelled. More particularly, if the free space left in the relay information storage 23 immediately after the start of a child node reception task is smaller than a threshold value, then the state controller 31 does not perform the processes in that child node reception task and switches the corresponding node to the sleep mode.

Meanwhile, in the corresponding-node transmission task on the next occasion; with the aim of distinguishing from a normal reception failure, the node having the hop count of two (the node N2) sets, in transmission information 205, information to indicate in the control information that the reception process has been cancelled due to a decrease in the free space of the relay information storage 23.

In the parent node reception task, upon receiving the transmission information 205 as received information 206, the child node (the node N3-4) can adjust the retransmission count and adjust the transmission failure count until connection termination. Then, at the next opportunity for transmission, that is, in the initial sub-frame of the second frame, the child node (the node N3-4) sends transmission information 207.

In the example illustrated in FIG. 12, the node having the hop count of two (the node N2) successfully sends the transmission information 205 in the initial frame; and, since there is available memory area in the relay information storage 23, successfully receives the transmission information 207 and successfully performs relay transmission of transmission information 208, which contains the sensor information included in the transmission information 207, in the second frame.

In the processes performed till the second frame, the node having the hop count of two (the node N2) has received the end flag from all child nodes with which a connection has been confirmed (the nodes N3-1 to N3-4) and has successfully sent the sensor information of the corresponding node. Hence, the node having the hop count of 2 (the node N2) does not wake up for transmission or reception in the third frame onward. In this specific example, it is illustrated that, when the reception is not possible due to storage limitations of the relay information storage 23, the power saving performance can be enhanced by not performing the reception process.

Third Example of Communication Control Method

With reference to FIGS. 9 and 12, since the number of time slots provided in a sub frame greater than the number of wireless communication devices 20. Hence, the aggregation device 10 can assign fixed time slots in each sub-frame for the transmission purposes of the wireless communication devices 20.

FIG. 13 is a sequence diagram illustrating a third example of the communication control method according to the embodiment. With reference to FIG. 13, the following explanation is given for a method by which the aggregation device 10 decides, in a fluid manner, the timing of transmission in the case in which the number of time slots provided in a sub-frame is equal to the number of wireless communication devices 20.

In FIG. 13, the number of nodes having the hop count of three has increased to eight from the four nodes illustrated in FIG. 9. Moreover, considering a single node having the hop count of one and a single node having a hop count of two, the total number of nodes is 10.

Meanwhile, there are 10 time slots (time slots a to j) in a sub-frame. As described till now, if the aggregation device 10 assigns, in a fixed manner, the time slot for transmission to the last time slot in a sub-frame, then there remains a deficit of one time slot. Hence, depending on the network topology and the setting of the number of sub-frames in a frame, there is a risk of deterioration in the communication quality due to interference.

In that regard, even if the number of time slots provided in a sub-frame is equal to the number of wireless communication devices 20, as the method for the aggregation device 10 to decide on the time slot for transmission while avoiding the issues explained above, the time slot that is assigned to the node ID of the node having the hop count of one is used.

In the example illustrated in FIG. 13, from among the time slots included in the sub-frame that is assigned to the node having the hop count of zero, the aggregation device 10 uses the time slot of the node having the hop count of one (the node N1) and sends sets of transmission information 211, 212, and 213.

In order to use this decision method, at least two or more sub-frames need to be present in a frame. By deciding on the time slot for transmission by the aggregation device 10 in the manner explained above, the frequency usage efficiency can be enhanced. Moreover, the number of installable wireless communication devices 20 can be increased.

Meanwhile, in the case in which the nodes having the hop count of one do not exist, such as in the initial stage of the configuration of the network 80, the aggregation device 10 can use the last time slot in a sub-frame and send the transmission information in a fixed manner. Regarding the details of the communication control method during the configuration of the network 80, the explanation is given later with reference to a specific example.

Fourth Example of a Communication Control Method

FIG. 14 is a sequence diagram illustrating a fourth example of the communication control method according to the embodiment. In FIG. 14 is illustrated an example of a different type of relay transmission in the case in which the number of time slots provided in a sub-frame is greater than the number of wireless communication devices 20. In FIG. 14, the number of nodes having the hop count of three is smaller by one than in FIG. 13. Moreover, the seven nodes having the hop count of three (nodes N3-1 to N3-7) are connected to the node having the hop count of two (the node N2).

As compared to the relay transmission explained till now, the relay transmission illustrated in FIG. 14 differs in the way of being performed in successive sub-frames. In other words, after receiving the received information from the child node in the super frame, the parent node is given the opportunity for transmission in each sub-frame. With that, the relay transmission illustrated in FIG. 14 is achieved. The transmission method in which the opportunity for transmission is given in each sub-frame is called sub-frame successive transmission.

More particularly, in the initial sub-frame of the initial frame, from among the transmission information sent from the end nodes of the network 80 (the nodes N3-1 to N3-7), the transmission information sent from three nodes (the nodes N3-1 to N3-3) is received as received information by the node having the hop count of two (the node N2). Then, the node having the hop count of two (the node N2) stores the received information as relay information in the relay information storage 23. Moreover, since the storage capacity of the relay information storage 23 is exceeded, the node having the hop count of two (the node N2) cancels the reception of the received information.

In the second sub-frame of the initial frame, the node having the hop count of two (the node N2) sends some part of the relay information, which is stored in the relay information storage 23 of the corresponding node, as a single packet. After sending the packet, the node having the hop count of two (the node N2) stores, for example, the data in the sent packet in a corresponding manner to control information in a retransmission buffer. The control information contains the retransmission count.

In the third sub-frame of the initial frame, the node having the hop count of two (the node N2) receives the received information of the parent node (the node N1) thereby confirming the arrival of the transmission information sent on the previous occasion. When the arrival is confirmed, the node having the hop count of two (the node N2) clears the data, whose arrival has been confirmed, from the retransmission buffer.

Moreover, in the third sub-frame of the initial frame, the node having the hop count of two (the node N2) too sends some or all of the relay information stored in the relay information storage 23.

In the fourth sub-frame of the initial frame, the node having the hop count of one (the node N1) and the node having the hop count of two (the node N send the transmission information following on the previous sub-frame.

The end condition of the sub-frame successive transmission is that the end flag is received from all child nodes with which a connection has been recognized in the concerned super frame and that the transmission of the received information received from those child nodes and the transmission of the transmission information of the corresponding node is finished.

Meanwhile, when the relay information to be sent is not available in the transmission buffer or the relay information storage 23, the node having the hop count of one (the node N1) and the node having the hop count of two (the node N2) can cancel the transmission.

Regarding the method of cancelling the transmission, any arbitrary method can be implemented. For example, cancellation of the transmission can be determined according to whether or not the corresponding-node transmission task is to be registered at the opportunity for transmission given after the child node reception on the next occasion. Alternatively, for example, the state controller 31 can register the corresponding-node transmission task in each sub-frame and, at the time of cancelling the transmission, does not perform the transmission process in the corresponding-node transmission task and promptly switches the corresponding node to the sleep mode.

Prevention of Chain of Cancellations of Transmission

For example, consider a case in which the node having the hop count of two (the node N2) cancels the transmission when there is no more transmission information to be sent and when the end flag is not yet received from all child nodes. In that case, since the parent node (the node N1) cannot receive the transmission information from the child node (the node N2), there is no transmission information to be sent. As a result, the node having the hop count of one (the node N1) too cancels the transmission, thereby leading to a chain of cancellations of the transmission.

In order to avoid termination of connection due to cancellations of the transmission, the communication controller 21 can send transmission information having empty data portion. Alternatively, for example, the communication controller 21 can send dummy data as the transmission information.

The setting of the successive reception failure count for determining the termination of connection can be set in accordance with the highest value of the number of cancellations of the transmission. For example, in the case illustrated in FIG. 14, the count of cancellations of the transmission is three (the value acquired by subtracting one from the number of sub-frames) at a maximum. Hence, the parent node can set the reception failure count, which is used in determining about the termination of connection with the child nodes, to be four times or more in succession.

Moreover, when there is no transmission information to be sent, the communication controller 21 can notify the same during the last transmission. That information is called transmission suspension information, which can be included in any field of a packet. For example, the transmission suspension information can be expressed as 1-bit information.

However, unlike the transmission continuation information explained earlier, regarding the transmission suspension information, when the parent node receives the transmission suspension information, it does not register the reception task of successive sub-frames but registers the child node reception task at the next opportunity for transmission given to the child node. More particularly, in the example illustrated in FIG. 14, the next opportunity for transmission given to the child node is the sub-frame on the next occasion corresponding to the remainder acquired by dividing the hop count of the child node by the number of sub-frames.

The processes performed by each node for achieving the relay transmission illustrated in FIG. 14 are basically the same as the flow illustrated in FIGS. 10 and 11. However, regarding the timing of registering the tasks on the next occasion and the rules of the timing, the relay transmission is different than the relay transmission illustrated in FIGS. 9 and 12.

Moreover, when there is one or more child nodes and when the transmission information is sent in successive sub-frames, the communication controller 21 can issues a notification about the same as child node existence information to the parent node. The child node existence information can be included in any field of a packet. For example, the child node existence information can be expressed as 1-bit information.

As a result of receiving a notification about the child node existence information, the parent node can get to know whether or not the child nodes further have child nodes and can perform transmission using subsequent successive sub-frames.

If a child node is a relaying node further having child nodes, then the state controller 31 needs to register the subsequent child node reception tasks in a corresponding manner to the transmission time slots of the child nodes in successive sub-frames. As is explained in this specific example, a relaying node sends transmission information in successive sub-frames. Hence, even if the transmission buffer or the relay information storage 23 have only a small storage capacity, it becomes possible to earn a number of opportunities for transmission. As a result, the relay transmission can be performed smoothly, and the reception cancellation count of the destination node can be held down thereby curbing unnecessary transmission from the source node. Thus, power saving can be achieved in the source node.

Given below is the explanation of an example of the network configuration method according to the embodiment.

First Example of Initial Destination Search

Figure 15B:
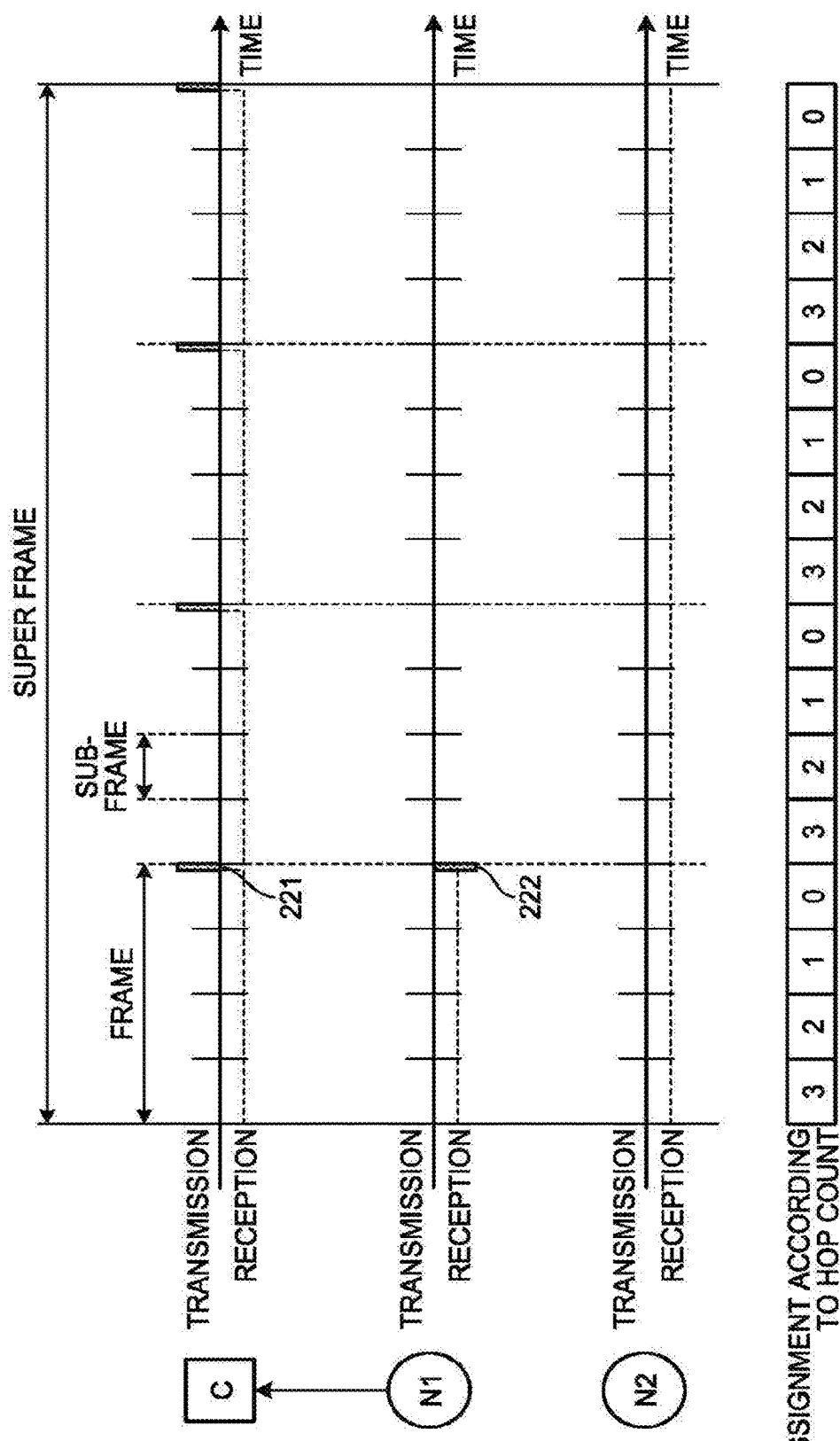

FIGS. 15A to 15C are sequence diagrams illustrating a first example of an initial destination search according the embodiment. The explanation is given for an example in which an aggregation device (C) and two nodes (N1 and N2) are present; and the aggregation device (C) and the node N1 are within the range of communication, while the node N1 and the node N2 are within the range of communication.

In the example illustrated in FIGS. 15A to 15C, the explanation is given about a case in which the power is supplied first to the aggregation device (C) (a case in which the process for performing wireless communication according to the embodiment has been started). However, the sequence of power supply can be any arbitrary sequence.

The aggregation device (C) sends a reference signal in the last time slot of each frame. After the power is supplied, the nodes N1 and N2 perform the initialization process and the sleep control process and then start a parent-node data reception process.

After performing the initialization but before performing the parent-node data reception process, it is not always necessary to perform the sleep control process. Once the parent-node data reception process is started, the nodes N1 and N2 switch to a reception standby state.

The node N1 receives a reference signal 221 as received information 222; stores the surrounding-node information, which is included in the received information 222, in the surrounding-node information storage 26; stores the frame information that is included in the received information 222 in the frame information storage 28; and gets in synchronization with the aggregation device (C).

Then, the node N1 switches to the sleep mode till the next super frame. Alternatively, the node N1 can switch to reception standby for the frame period till the start of the next super frame. When received information is received during the reception standby, the node N1 stores the surrounding-node information, which is included in the received information, in the surrounding-node information storage 26 in an identical manner; and updates the frame information storage 28 using the frame information included in the received information.

In the initial frame of the next super frame, the node N1 selects the parent node based on the surrounding-node information stored in the surrounding-node information storage 26. The method for selecting the parent node can be any arbitrary method. For example, as the method for selecting the parent node, the node having the smallest hop count while satisfying a specific reception power threshold value is selected as the parent node.

In the case in which the aggregation device (C) is selected as the parent node, since the aggregation device (C) is ready for reception on a constant basis, the timing at which the node N1 sends transmission information 223 indicating a connection request is, for example, the initial frame of the next super frame as illustrated in FIG. 15G.

Meanwhile, the node N2 receives the transmission information 223 of the node N1 as received information 224, and thus can acquire the frame information for the first time. In the example illustrated in FIG. 15C, since the frame in which the received information 224 is received is the initial frame of the super frame, the node N2 switches to reception standby till the end of that period of time and then selects the node N1 as the parent node.

If the aggregation device (C) is not selected as the parent node, then the timing of sending a connection request is set to the last frame of the same super frame. By setting the timing to the last frame, the transmission of the transmission information can be started from the next super frame, thereby making it possible to shorten the delay time till the participation in the network 80.

The node N1 that has participated in the network 80 performs connection acceptance in a specific time slot for the purpose of accepting a connection to the corresponding node. The specific time slot is, for example, the time slot corresponding to the node ID of the corresponding node as included in the sub-frame corresponding to the remainder acquired when a value that is acquired by subtracting two from the hop count of the corresponding node is divided by the number of sub-frames.

Meanwhile, there can be a plurality of specific time slots. For example, in addition to the example given above, even in the sub-frame corresponding to the remainder that is acquired when a value acquired by subtracting one and three from the hop count of the corresponding node is divided by the number of sub-frames, connection acceptance can be performed. As a result of setting a plurality of time slots for connection acceptance, a greater number of connections can be accepted in the super frame, thereby enabling a smooth configuration of the network 80.

The node N1 that has participated in the network 80 registers the connection acceptance task at the end or at the start of a frame. The node N2 that requests for a connection identifies the time slot for connection acceptance in the parent node (the node N1) and sends transmission information 225, which indicates the connection request, in the identified time slot. The transmission information 225 at least contains the node ID of the corresponding node.

When the transmission information 225 is received as received information 226, the parent node (the node N1) can immediately send transmission information 227, which indicates a confirmation response, to the child node (the node N2).

Meanwhile, when the power is supplied on a constant basis and when power need not be saved by switching to the sleep mode, the aggregation device (C) becomes able to receive information on a constant basic and thus need not have particular setting for connection acceptance. The node N1 does not send a signal for a connection request to the aggregation device (C) (see FIGS. 15A and 15B) and starts sending the transmission information 223 in the next super frame (see FIG. 15C). When the node N1 sends the transmission information 223, the node N2 receives the transmission information 223 as the received information 224. Then, the node N2 stores the surrounding-node information, which is included in the received information 224, in the surrounding-node information storage 26.

The node N2 selects the node N1 as the parent node and, in the frame of the super frame, sends the transmission information 225 indicating a connection request in the time slot decided according to the rule explained above. In the example illustrated in FIG. 15C, connection acceptance is performed in the initial sub-frame of the last frame of the super frame; and the transmission information 227, which indicates a confirmation response, is immediately sent back. Then, in the next super frame of the super frame illustrated in FIG. 15C, the node N2 starts sending the transmission information. As a result of implementing the network configuration method explained above, the wireless communication system 100 can build the network 80 with lower power consumption.

Second Example of Initial Destination Search

Figure 16A:
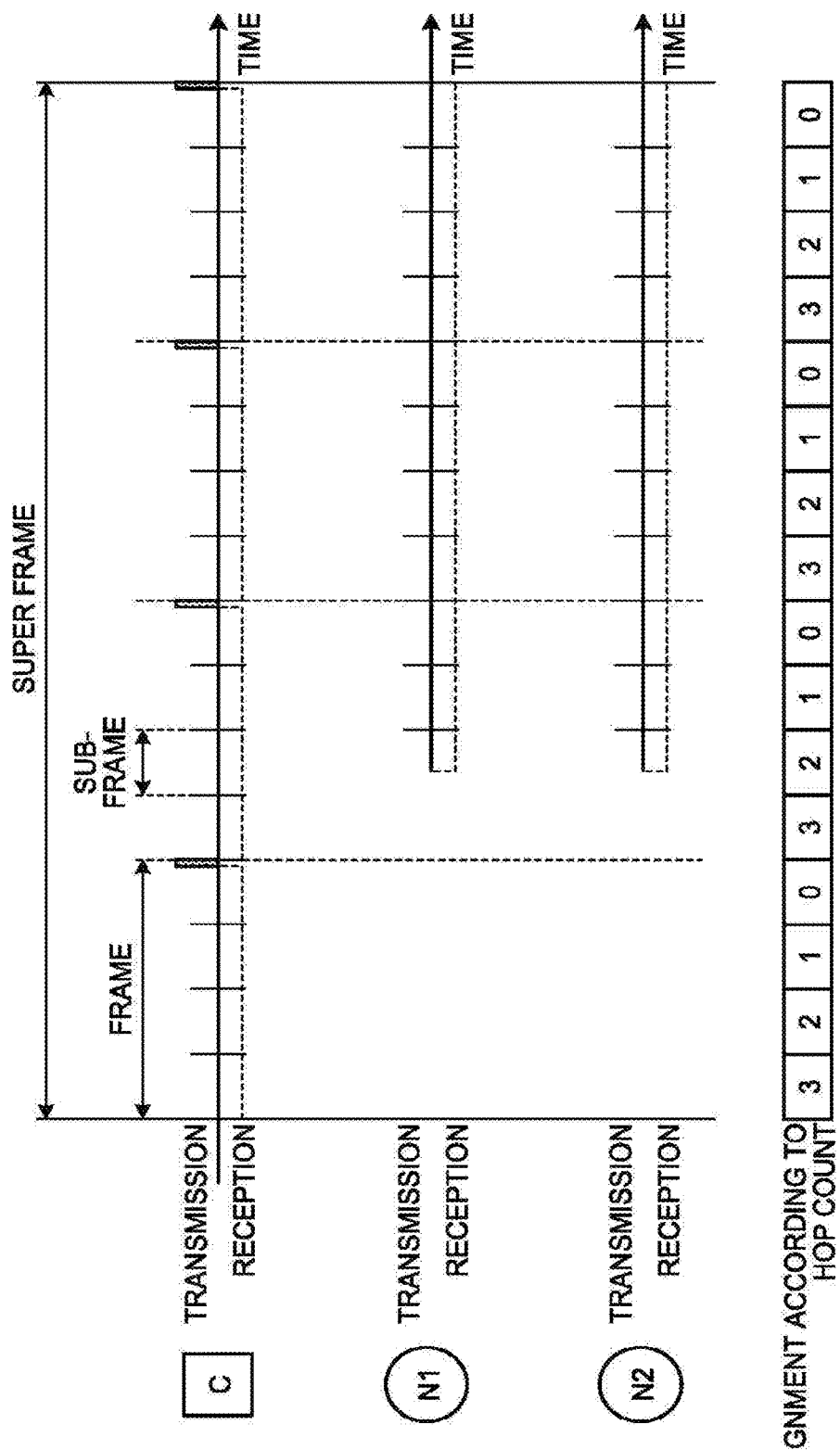

FIGS. 16A to 16C are sequence diagrams illustrating a second example of the initial destination search according to the embodiment. In the explanation given with reference to FIGS. 15A to 15C, when the number of time slots provided in a sub-frame is greater than the number of wireless communication devices 20, the transmission time slot for the aggregation device 10 is assigned in a fixed manner. With reference to FIGS. 16A to 16C, the explanation is given for a case in which, when the number of time slots provided in a sub-frame is equal to the number of wireless communication devices 20, the transmission time slot for the aggregation device 10 is assigned in a fluid manner.

Figure 17:
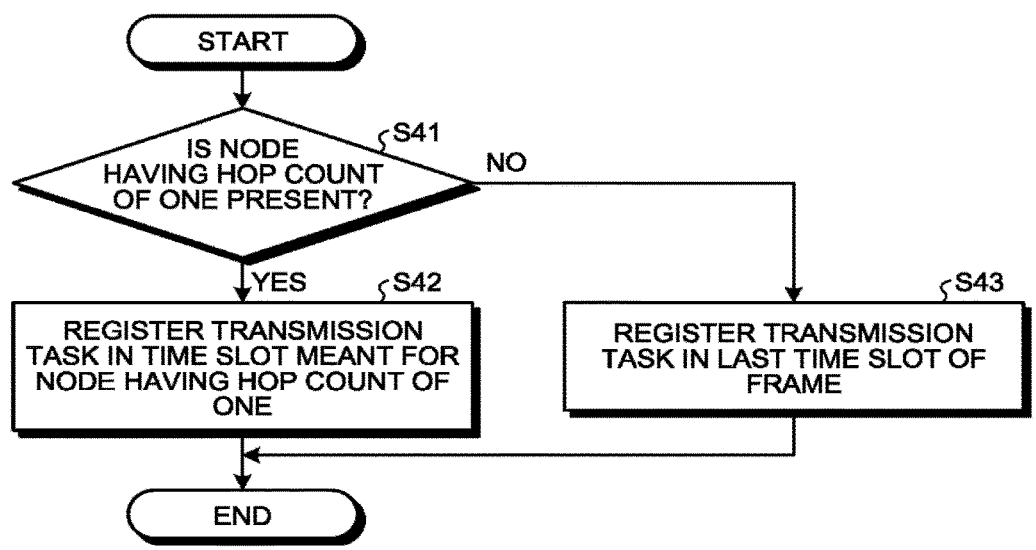
FIG. 17 is a flowchart for explaining a first example of a method for deciding on the transmission timing for the aggregation device according to the embodiment.

Explained below with reference to FIG. 17 is a method of operation of the aggregation device 10 for implementing the operations illustrated in the sequence diagrams in FIGS. 16A to 16C.

FIG. 17 is a flowchart for explaining a first example of the method for deciding on the transmission timing for the aggregation device 10 according to the embodiment. In the first method illustrated in FIG. 17, the transmission time slot for the aggregation device 10 is decided when the number of time slots provided in a sub-frame is equal to the number of wireless communication devices 20.

Firstly, the decider 16 of the aggregation device 10 determines whether or not a node having the hop count of one is present (Step S41). If a node having the hop count of one is present (Yes at Step S41), then the decider 16 registers, in the sub-frame assigned to the node having the hop count of zero, a transmission task in the time slot corresponding to the node ID of the node having the hop count of one, and decides on the transmission timing (Step S42).

If a node having the hop count of one is not present (No at Step S41), then the decider 16 register a transmission task of sending a reference signal in a fixed manner in the last time slot of the frame, and decides on the transmission timing (Step S43). However, the time slot for registering the transmission task of sending a reference signal in a fixed manner need not always be the last time slot.

Since the aggregation device 10 sends transmission information using the time slot assigned to the corresponding node, the node having the hop count of one registers the parent node reception task in such a way that the transmission information is received at the concerned timing.

Returning to the explanation with reference to FIG. 16A, after the power is supplied (after the processes are started), in the first super frame, since the node having the hop count of one (the node N1) has not been recognized, the aggregation device (C) sends transmission information indicating a reference signal in the last time slot of each frame.

In FIG. 16B indicating the next super frame, as explained with reference to FIG. 15, the node N1 receives, in the initial frame, transmission information 231 indicating the reference signal as received information 232.

In FIG. 16C indicating the still next super frame, the node having the hop count of two (the node N2) receives transmission information 233, which is sent by the node N1 in the initial frame, as received information 234 and recognizes the existence of the node having the hop count of one (the node N1).

In the following frames, the aggregation device (C) sends transmission information indicating a reference signal in the time slot for the node N1 in the sub-frame for transmission by the node having the hop count of zero.

When a plurality of nodes having the hop count of one is present, the aggregation device (C) sends sets of transmission information, each of which indicates a reference signal, equal in number to the number of nodes having the hop count of one. By increasing the opportunities for transmission of the aggregation device (C), the nodes that newly participate in the network 80 can acquire the frame information at an early stage and can switch to the sleep mode till the initial frame of the next super frame. That enables achieving power saving of the nodes. In the specific example illustrated in FIG. 16, the operations of the node N2 are identical to the operations of the node N2 explained with reference to FIG. 15. Hence, that explanation is not repeated.

Figure 18:
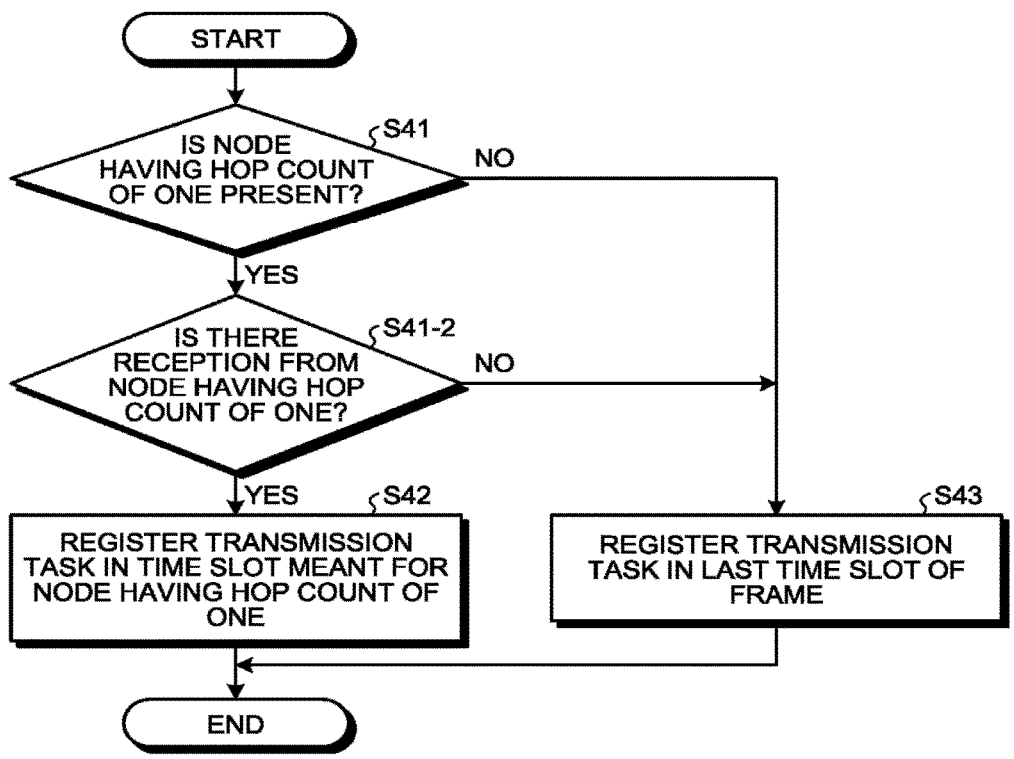
FIG. 18 is a flowchart for explaining a second example of the method for deciding on the transmission timing for the aggregation device according to the embodiment.

FIG. 18 is a flowchart for explaining a second example of the method for deciding on the transmission timing of the aggregation device according to the embodiment. In the second example illustrated in FIG. 18, the process added at Step S41-2 is different than the flowchart illustrated in FIG. 17. When the aggregation device (C) decides on the transmission time slot according to the flowchart illustrated in FIG. 18, in the second frame onward illustrated in FIG. 16C, the aggregation device (C) sends transmission information indicating a reference signal only in the last time slot of the frame. When a plurality of nodes having the hop count of one is present, the transmission count of the aggregation device (C) can be reduced as compared to the flowchart illustrated in FIG. 17.

Example of Neighbor Search and Reconnection

FIG. 19 is a sequence diagram for explaining an example of a destination search in response to the termination of connection of the wireless communication device 20 according to the embodiment. In FIG. 19 is illustrated an example of processes that, when the node N2 that once got connected to the network 80 loses connection with the parent node (the node N1), are performed for again establishing connection with the parent node (the node N1).

For example, when the arrival of the transmission information cannot be confirmed because of exceeding the specific count, the node N2 newly searches for the destination. With the mechanism of relay transmission according to the embodiment, the transmission information is highly likely to be sent in the initial frame of the super frame. Hence, the node N2 switches to reception standby in the initial frame of the super frame, and attempts to collect the surrounding-node information.

Moreover, in order to improve on the power saving, the node N2 switches to reception standby only in the sub-frames corresponding to, for example, the hop counts greater by one and smaller by one than the pre-disconnection hop count of the corresponding node, and collects the surrounding-node information for a shorter reception standby period. This process is called neighbor search.

In FIG. 19 is illustrated a case in which, as a result of performing the neighbor search, the node N2 again receives transmission information 241 of the node N1 as received information 242 and sends transmission information 243 indicating a connection request in the last frame of the super frame.

Moreover, in FIG. 19 is illustrated a case in which, when the surrounding-node information cannot be acquired in the neighbor search or when the surrounding-node information is acquired but is received from nodes not satisfying the specific reception power, that is, not received from a node satisfying the criteria for parent node selection; the node N2 extends the reception standby period. Herein, the extension of the reception standby period is performed on a frame-by-frame basis.

Meanwhile, in order to improve on the power saving, for example, the node N2 can perform the neighbor search with respect to a specific number of super frames and, if the parent node is not selected in spite of that, can extend the reception standby period. Alternatively, for example, the node N2 can repeatedly perform the neighbor search having the same scope in a specific number of super frames and then extend the reception standby period. Still alternatively, the node N2 can perform reception standby for the entire period from the beginning without determining whether or not to extend the reception standby period.

Meanwhile, after once getting connected to any one of the parent nodes, if the number of times of failure in the reception process of the parent node reception task is equal to or greater than a threshold value, or if the number of times of failure in the arrival confirmation done using the received information received in the parent node reception task is equal to or greater than a threshold value, then the node N2 can skip the neighbor search and send transmission information indicating a connection request to the parent node.

As described above, the wireless communication device 20 performs time-division communication using frames that indicate the length of the communicable time. Based on frame information containing the number of sub-frames included in a frame, the number of time slots included in a sub-frame, and the length of the time slots, and based on identification information enabling identification of the wireless communication device 20; the transmission-reception resource decider 27 (a decider) decides on the usable time slots for transmission by the wireless communication device 20. Moreover, based on the frame information and based on the hop count from the wireless communication device 20 to the aggregation device 10, the transmission-reception resource decider 27 decides on the sub-frames usable for transmission by the wireless communication device 20. At the start of transmission or reception by the wireless communication device 20, the state controller 31 switches the operating state of the wireless communication device 20 from the sleep mode to the activated state. After the end of transmission or reception by the wireless communication device 20, the state controller 31 switches the operating state of the wireless communication device 20 from the activated state to the sleep mode. Then, the communication controller 21 (the continuation determiner 32) determines whether or not the transmission is to be continued. If the transmission is to be continued, then the communication controller 21 performs transmission using the next usable time slot for transmission by the wireless communication device 20 and determines whether or not the reception is to be continued. If the reception is to be continued, the communication controller 21 performs reception using the next usable time slot for transmission by at least one source node.

Using the wireless communication system 100 according to the embodiment, in the network 80 having the time-division communication method, until collection of the sensor information in the aggregation device 10, activation for only the bare minimum transmission and reception enables dealing with a high communication load, and power saving can also be achieved.

Moreover, also in the process of searching for the destination, the wireless communication device 20 performs reception standby with priority to the periods of time in which the surrounding nodes are likely to be performing transmission, and proactively switches to the sleep mode in the other periods of time. That enables achieving reduction in the power consumption.

For example, a seismic intensity meter can be installed as a sensor in a building, and the wireless communication device 20 can acquire the sensor information. In the case of installing the wireless communication device 20 in an existing building, it can be operated using battery cells thereby enhancing the degree of freedom regarding the installation location. Then, by implementing the wireless communication system 100 according to the embodiment, the frequency of battery replacement can be reduced, that is, the maintenance cost can be reduced. Moreover, using multihop communication, for example, it becomes possible to ease restrictions on the power supply of the aggregation device 10 and on the installation location attributed to a communication line.

As other applications thereof, the wireless communication system 100 according to the embodiment can collect the following types of information in a wireless manner: sensor information of a temperature-humidity management system in which a thermo-hygrometer is used as the sensor; sensor information of a plant growth monitoring system in which a $CO_2$ sensor and an ambient light are used; sensor information of a river floods monitoring system and a slope monitoring system in which an angular velocity sensor is used; sensor information of a landslide detection system in which a moisture sensor is used; sensor information of a radiation dose monitoring system in which a radiation dosimeter is used; sensor information of an intruder detection system in which an image sensor is used; and log information of an existing air-conditioning system.

In the wireless communication system 100 according to the embodiment, although a lot of opportunities for communication are given for the purpose of achieving a large capacity, the information scheduled to be subsequently communicated is appropriately shared thereby making it possible to perform operations with a bare minimum number of activations. Hence, power saving can be achieved in the wireless communication devices 20. Thus, according to the embodiment, power saving can be achieved along with achieving a large capacity.

Case of Implementation Using Computer Programs

From among the function blocks of the aggregation device 10 (see FIG. 6) and from among the functional blocks of the wireless communication device 20 (see FIG. 7), the functional blocks that can be implemented using computer programs can be implemented so.

The computer programs executed in the aggregation device 10 and the wireless communication device 20 according to the embodiment are stored as installable files or executable files in a computer-readable recording medium such as a compact disk read only memory (CD-ROM), a memory card, a compact disk recordable (CD-R), or a digital versatile disc (DVD); and are provided as a computer program product.

Alternatively, the computer programs executed in the aggregation device 10 and the wireless communication device 20 according to the embodiment can be stored in a downloadable manner in a computer connected to a network such as the Internet.

Still alternatively, the computer programs executed in the aggregation device 10 and the wireless communication device 20 according to the embodiment can be distributed via a network such as the Internet without involving downloading.

Still alternatively, the computer programs executed in the aggregation device 10 and the wireless communication device 20 according to the embodiment can be stored in advance in a read only memory (ROM).

The computer programs executed in the aggregation device 10 and the wireless communication device 20 according to the embodiment contain modules of such functions, of the functional configuration of the aggregation device 10 and the wireless communication device 20 according to the embodiment, which can be implemented using computer programs.

Meanwhile, some or all of the functions of the aggregation device 10 and the wireless communication device 20 according to the embodiment can be implemented using hardware such as an integrated circuit (IC) that is, for example, a processor for performing dedicated processes.

Moreover, in the case of implementing the functions using a plurality of processors, each processor can be used either to implement a single function or to implement two or more functions.

The aggregation device 10 and the wireless communication device 20 according to the embodiment can have any arbitrary mode of operations. For example, the aggregation device 10 and the wireless communication device 20 according to the embodiment can be operated as devices constituting a cloud system in a network.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A wireless communication device that performs time-division communication, comprising:
storage configured to store transmission data to be sent in a first period of time; and
one or more processors configured to perform a transmission process of sending the transmission data in a first frame at start of a plurality of frames included in the first period of time, or perform a transmission process of sending divided pieces of the transmission data in a plurality of successive frames beginning from the first frame and included in the first period of time, wherein
after the transmission process, the wireless communication device switches to sleep mode in one or more frames of the first period of time, and
when received data that is received from another wireless communication device contains information indicative of an ending, the wireless communication device switches to the sleep mode in one or more frames of the first period of time after a transmission process of sending transmission data that contains the received data containing the information indicative of the ending.

2. The device according to claim 1, wherein the transmission data contains at least either data generated by the device or received data received from another wireless communication device.

3. The device according to claim 1, wherein
the one or more processors performs a reception process of receiving received data from another wireless communication data in the plurality of successive frames beginning from the first frame and included in the first period of time,
the storage stores data containing the received data as pieces of transmission data corresponding to the respective successive frames, and
the one or more processors performs a transmission process of dividing the data into the pieces of transmission data and sending each piece of transmission data.

4. The device according to claim 1, wherein
after the transmission process, the one or more processors receives, from destination of the transmission data, reception confirmation information indicating whether the transmission data has been successfully received, and
the one or more processors again performs a transmission process of sending the transmission data that has been subjected to the transmission process when the reception confirmation information indicates that the transmission data has not been successfully received.

5. A wireless communication system that performs time-division communication and that is configured with a plurality of wireless communication devices, the wireless communication system comprising:
storage configured to store transmission data to be sent in a first period of time; and
one or more processors configured to perform a transmission process of sending all of the transmission data in a first frame at start of a plurality of frames included in the first period of time, or perform a transmission process of sending divided pieces of the transmission data in a plurality of successive frames beginning from the first frame and included in the first period of time, and of sending the divided transmission data, wherein after the transmission process, the wireless communication device switches to sleep mode in one or more frames of the first period of time, and when received data that is received from another wireless communication device contains information indicative of an ending, the wireless communication device switches to the sleep mode in one or more frames of the first period of time after a transmission process of sending transmission data that contains the received data containing the information indicative of the ending.

6. The system according to claim 5, further comprising an aggregation device configured to aggregate transmission data of the plurality of wireless communication devices, wherein in the first period of time, the aggregation device aggregates all of transmission data of the plurality of wireless communication devices.

7. The system according to claim 6, wherein the transmission data having been sent by a wireless communication device contains received data from another wireless communication device that has a greater hop count than a hop count, from the aggregation device, of the wireless communication device having sent the transmission data.

8. The system according to claim 6, wherein, the wireless communication device having a greater hop count from the aggregation device switches to sleep mode at an earlier frame in the first period of time.

* * * * *